US012387284B2

(12) United States Patent
Gulati

(10) Patent No.: US 12,387,284 B2
(45) Date of Patent: Aug. 12, 2025

(54) UTILIZING DIGITAL SIGNALS TO INTELLIGENTLY MONITOR CLIENT DEVICE TRANSIT PROGRESS AND GENERATE DYNAMIC PUBLIC TRANSIT INTERFACES

(71) Applicant: Lyft, Inc., San Francisco, CA (US)

(72) Inventor: Mayank Gulati, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 875 days.

(21) Appl. No.: 16/914,813

(22) Filed: Jun. 29, 2020

(65) Prior Publication Data

US 2021/0407031 A1  Dec. 30, 2021

(51) Int. Cl.
*G06Q 50/40* (2024.01)
*G01C 21/34* (2006.01)
(Continued)

(52) U.S. Cl.
CPC .......... *G06Q 50/40* (2024.01); *G01C 21/343* (2013.01); *G06N 20/00* (2019.01); *G06Q 10/047* (2013.01); *G06Q 10/06312* (2013.01); *G06Q 50/14* (2013.01); *G06Q 50/26* (2013.01); *G08G 1/20* (2013.01)

(58) Field of Classification Search
CPC ................. G06Q 50/30; G06Q 10/047; G06Q 10/06312; G06Q 50/14; G06Q 50/26; G01C 21/343; G01C 21/3415; G01C 21/3423; G06N 20/00; G08G 1/20; G08G 1/123; G08G 1/137
See application file for complete search history.

(56) References Cited

U.S. PATENT DOCUMENTS

2014/0180570 A1* 6/2014 Bast ..................... G01C 21/343
 701/408
2018/0283883 A1* 10/2018 Iland ....................... H04W 4/02
(Continued)

FOREIGN PATENT DOCUMENTS

CN  109583879 A  *  4/2019

OTHER PUBLICATIONS

Ferris, Brian, Kari Watkins, and Alan Borning. "Location-aware tools for improving public transit usability." 2010. IEEE Pervasive Computing 9.1 pp. 1-9. (Year: 2010).*

*Primary Examiner* — Amanda Gurski
(74) *Attorney, Agent, or Firm* — Keller Preece PLLC

(57) ABSTRACT

This disclosure describes an active public transit itinerary system that that utilize digital signals and public transit data to accurately, flexibly, and efficiently monitor client device transit progress across public transit vehicles and generate dynamic public transit interfaces. For example, based on comparing digital signals corresponding to the client device and public transit data, the active public transit itinerary system can determine when a client device is traveling on a public transit vehicle. Furthermore, the disclosed systems can actively generate (and provide for display via public transit graphical user interfaces) alternative public transit itineraries. For example, the disclosed systems can generate a public transit graphical user interface that includes updates to the public transit itinerary (e.g., based on downstream changes to public transit segments) or provides more efficient alternative travel paths to the destination.

20 Claims, 12 Drawing Sheets

(51) Int. Cl.
*G06N 20/00* (2019.01)
*G06Q 10/047* (2023.01)
*G06Q 10/0631* (2023.01)
*G06Q 50/14* (2012.01)
*G06Q 50/26* (2024.01)
*G08G 1/00* (2006.01)

(56) References Cited

U.S. PATENT DOCUMENTS

| | | | |
|---|---|---|---|
| 2019/0206009 A1* | 7/2019 | Gibson | G06Q 50/40 |
| 2020/0005633 A1* | 1/2020 | Jin | G06F 21/6254 |
| 2020/0132480 A1* | 4/2020 | Majima | G01C 21/3438 |
| 2020/0272953 A1* | 8/2020 | Ning | G06F 16/248 |
| 2020/0327343 A1* | 10/2020 | Lund | H04W 4/46 |
| 2020/0378771 A1* | 12/2020 | Beaurepaire | G06Q 30/0284 |
| 2022/0122011 A1* | 4/2022 | Islam | G06Q 10/0631 |
| 2024/0019252 A1* | 1/2024 | Meyer | G01C 21/3484 |

* cited by examiner

UTILIZING DIGITAL SIGNALS TO INTELLIGENTLY MONITOR CLIENT DEVICE TRANSIT PROGRESS AND GENERATE DYNAMIC PUBLIC TRANSIT INTERFACES

BACKGROUND

Recent years have seen significant development in transportation matching systems that utilize web and mobile applications to manage real-time on-demand transportation requests from requestor devices. For example, on-demand transportation matching systems can match provider devices with requestor devices to provide transportation across a variety of geographic locations. Transportation matching systems can also utilize web and mobile applications to match public transportation options to transportation requests from requestor devices. Despite many advances, conventional transportation matching systems continue to suffer from a number of technical drawbacks particularly in relation to accuracy, flexibility, and efficiency of implementing computer systems in fulfilling and dynamically updating public transportation requests.

SUMMARY

One or more implementations described herein provide benefits and/or solve one or more of the foregoing or other problems in the art with methods, non-transitory computer-readable media, and systems that utilize digital signals and public transit data to accurately, flexibly, and efficiently monitor client device transit progress across public transit vehicles and generate dynamic public transit interfaces. To illustrate, in response to receiving a transportation request to travel to a destination, the disclosed systems can provide, for display via a client device transit interface, a public transit itinerary that includes set of public transit vehicles traveling along public transit segments to the requested destination. In addition, the disclosed systems can monitor digital signals corresponding to the client device to determine when the client device is traveling on a public transit vehicle servicing a public transit segment included in the public transit itinerary. Utilizing these digital signals and public transit data corresponding to public transit vehicles, the disclosed systems can intelligently monitor client device progress along the public transit itinerary. Furthermore, the disclosed systems can actively generate (and provider for display via public transit graphical user interfaces) alternative public transit itineraries. For example, the disclosed systems can generate a public transit graphical user interface that include updates to the public transit itinerary (e.g., based on downstream changes to public transit segments) or provides more efficient alternative travel paths to the destination.

Further, the disclosed systems can provide public transit user interfaces with alternative public transit itineraries to the client device in real-time, while the client device is traveling on a public transit vehicle. For example, in one or more implementations, while the client device is traveling on a public transit vehicle within a public transit segment, the disclosed systems actively analyze alternate public transit itineraries and provide alternative public transit itineraries to the client device proactively (e.g., automatically upon determining a better alternative public transit itinerary). In some implementations, the disclosed systems monitor user interactions at the client device while the client device is traveling on the public transit vehicle and provides the alternative public transit itineraries reactively in response to user interactions indicating a request for alternatives. In either case, the disclosed systems can accurately, flexibly, and efficiently generate and provide dynamic public transit interfaces based on digital signals corresponding to client devices.

Additional features and advantages of one or more implementations of the present disclosure are outlined in the following description, and in part will be obvious from the description, or may be learned by the practice of such example implementations.

BRIEF DESCRIPTION OF THE DRAWINGS

The detailed description refers to the drawings briefly described below.

DETAILED DESCRIPTION

Figure 1:
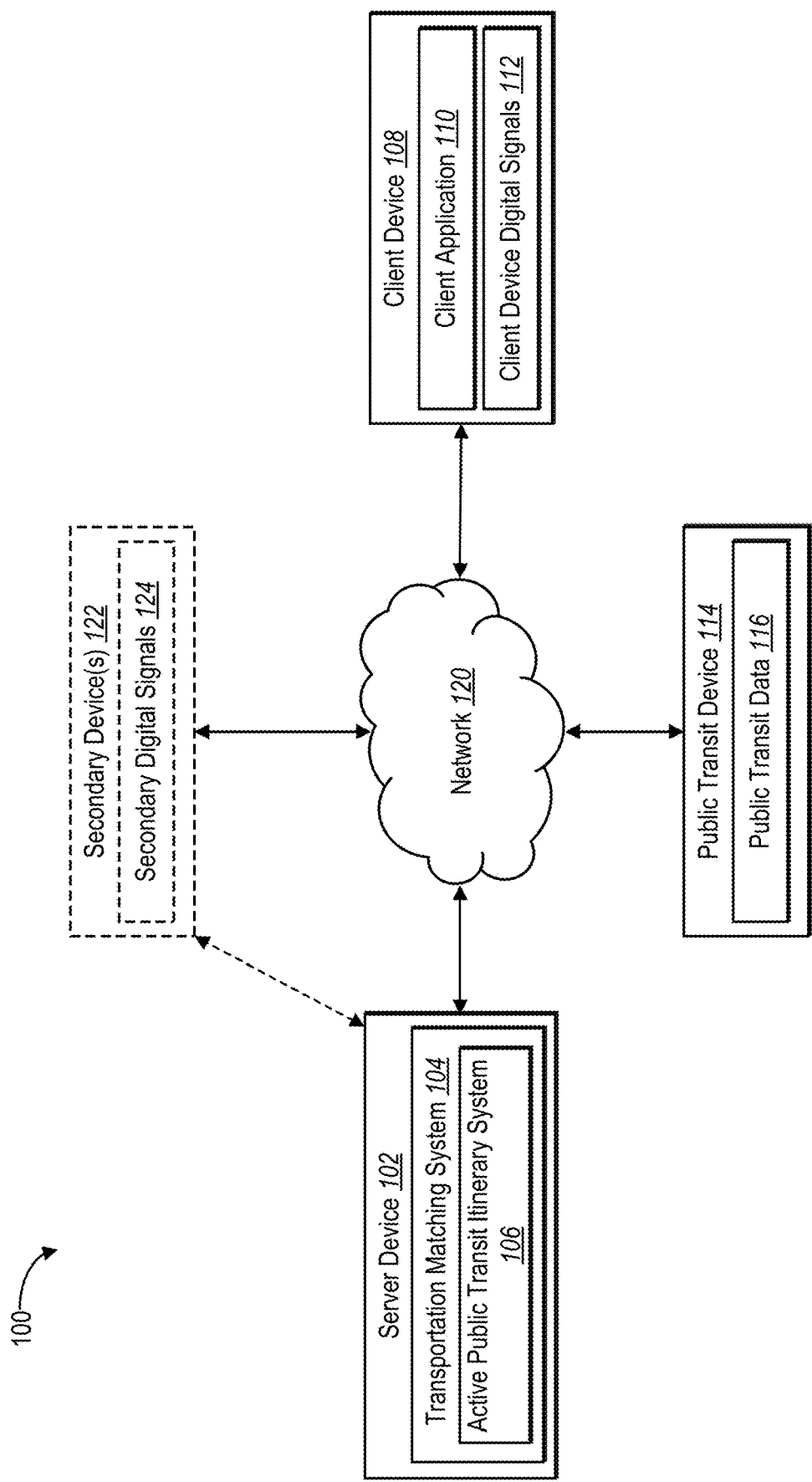
FIG. 1 illustrates a block diagram of a system environment for implementing an active public transit itinerary system in accordance with one or more implementations.

This disclosure describes an active public transit itinerary system that utilizes computer-implemented models to analyze digital signals corresponding to a client device (and public transit data corresponding to public transit vehicles) to intelligently monitor client device transit progress and generate dynamic public transit interfaces. For example, the active public transit itinerary system (or simply transit itinerary system) can identify a transportation request from a requestor device and provide a public transit interface that includes public transit itineraries (e.g., target public transit vehicles traveling along public transit segments to a requested destination). Furthermore, the active public transit itinerary system can utilize digital signals corresponding to the client device together with public transit data to determine when a client device is actively traveling on a public transit vehicle corresponding to a public transit segment of the public transit itinerary. Moreover, in response to determining that the client device is traveling on a public transit vehicle, the transit itinerary system can dynamically analyze and surface more efficient alternative public transit itineraries via a public transit interface. Specifically, based on the current public transit vehicle and public transit segment, the transit itinerary system can utilize public transit data to identify upcoming public transit stops and provide more efficient alternate public transit itineraries corresponding to these upcoming stops.

As just mentioned, in one or more embodiments, the transit itinerary system can generate a public transit itinerary corresponding to a client device. For instance, the transit itinerary system can receive a transportation request to a destination from a client device (e.g., a requestor device). In response, the transit itinerary system can analyze available transportation options (e.g., matched rides via a provider device or various public transportation vehicles) and identify a plurality of transportation itineraries, including public transit itineraries. Specifically, in response to selection of one or more public transit options, the transit itinerary system can generate a public transit interface that includes one or more public transit itineraries with public transit segments serviced by various public transit vehicles. In response to selection of a public transit itinerary, the transit itinerary system can monitor progress of the client device and provide various user interfaces for traveling to the destination location.

As mentioned above, the transit itinerary system can monitor progress along public transit segments by determining public transit vehicles utilized by the client device. For example, in one or more implementations, the public transit itinerary includes a target public transit vehicle for traveling along a first public transit segment. The transit itinerary system can utilize travel data of the target public transit vehicle and the digital signals of the client device to confirm that the client device is traveling on the target public transit vehicle. Further, the transit itinerary system can cause the client device to update a graphical user interface to show the client device traveling on the target public transit vehicle as it travels along the first public transit segment.

In one or more implementations, the transit itinerary system can determine that the client device is not traveling on the target public transit vehicle (e.g., determine that the client device is traveling on a different public transit vehicle than anticipated in the public transit itinerary). For example, based on comparing the travel data of the target public transit vehicle and the digital signals of the client device, the transit itinerary system can determine the client device is not yet traveling on a public transit vehicle or traveling on another public transit vehicle. In response, the transit itinerary system can generate alternate public transit itineraries and provide them for display via the client device.

As mentioned above, the transit itinerary system can compare travel data of a public transit vehicle (e.g., the target public transit vehicle or another public transit vehicle) to the digital signals of the client device. The transit itinerary system can monitor a variety of digital signals corresponding to a client device, including real-time location information, motion signals, or beaconing information (e.g., a Wi-Fi beacon that detects location of a client device). Similarly, the transit itinerary system can identify a variety of travel data, such as real-time transit vehicle location information or public transit scheduling information (e.g., stop times and locations).

In various implementations, the transit itinerary system compares the travel data of the public transit vehicle to the digital signals corresponding to the client device to determine a public transit vehicle utilized by a client device. For example, the transit itinerary system can compare real-time location information of the client device to real-time location information of a public transit vehicle or compare motion signals of the client device to scheduled travel of the public transit vehicle. As described in greater detail below, the transit itinerary system can match various pieces of public transit data to various digital signals to identify and/or confirm the public transit vehicle on which the client device is traveling.

As mentioned above, the transit itinerary system can determine alternative public transit itineraries while the client device is traveling on a public transit vehicle. In various implementations, the transit itinerary system identifies upcoming public transit stops for the public transit vehicle on which the client device is traveling and generates public transit itineraries based on the upcoming public transit stops. For example, the transit itinerary system utilizes travel data of the public transit vehicle to determine an estimated time of arrival (ETA) of the next public transit stop. Then, based on the ETA, the transit itinerary system determines alternative public transit itineraries (e.g., alternate public transit vehicles and public transit segments) to the destination.

In one or more embodiments, the transit itinerary system intelligently selects which alternative public transit itineraries to surface to user interfaces at the client device. For example, as described below, the transit itinerary system can weight the public transit itineraries based on one or more factors. In addition, the transit itinerary system can generate public transit itinerary scores for each of the alternative public transit itineraries and provide the alternative public transit itineraries that meet one or more threshold criteria.

In one or more embodiments, the transit itinerary system accounts for the fact that the client device is currently traveling on a particular public transit vehicle in surfacing alternate public transit itineraries to the client device. For example, as described above, the transit itinerary system can identify a current public transit vehicle and then utilize the current public transit vehicle to determine alternate public transit itineraries that would require a transfer from the current public transit vehicle. To illustrate, in some embodiments, the transit itinerary system applies transfer weights to alternate public transit itineraries that require a transfer from the current public transit vehicle to identify efficient alternatives during a public transfer segment.

Further, the transit itinerary system can proactively update the public transit itinerary. For example, in one or more implementations, the transit itinerary system automatically detects changes to the public transit itinerary previously provided to the client device. To illustrate, the transit itinerary system can identify delays in public transit vehicles that would alter a public transit itinerary. In response, the transit itinerary system can determine updates to the public transit itinerary and provide those updates to the client device without requiring any action on the part of the user.

Similarly, in some implementations, the transit itinerary system can proactively provide alternative public transit itineraries to the client device. For example, based on determining that the client device is traveling on a public transit vehicle, the transit itinerary system can, without requiring any user action, identify alternative public transit itineraries. When an alternative public transit itinerary is determined to be more efficient than the current public transit itinerary, the transit itinerary system notifies the client device of a potentially better alternative public transit itinerary.

Additionally, the transit itinerary system can provide public transit itinerary updates as well as alternative public transit itineraries to the client device in response to requests received by the client device. For example, while traveling on a public transit vehicle, the transit itinerary system can identify a user interaction that indicates a request for alternative public transit itineraries. In response, the transit itinerary system can generate and provide alternative public transit itineraries that are based on the client device currently traveling on the public transit vehicle.

Moreover, the client device can provide additional notifications via a public transit interface to further improve efficiency and flexibility. For example, in various implementations, the transit itinerary system provides user interfaces with enhanced directions and up-to-date information, such as continuously updating public transit itineraries, providing wayfinding information, displaying various notifications with respect to the public transit itinerary, and showing visual comparisons between public transit itineraries.

As mentioned above, conventional transportation matching systems suffer from a number of technical drawbacks in relation to accuracy, flexibility, and efficiency of operation. To illustrate, conventional transportation provider systems are often inaccurate. For example, conventional systems often inaccurately assume that a client device will travel on a particular target public transit vehicle, despite the fact that users often alternate vehicles (e.g., hop on a different bus or subway train). This approach often disrupts the accuracy of an entire transportation route, as an inaccurate public transit vehicle will often impact downstream public transit segments.

In addition, conventional transportation matching systems often generate inaccurate transportation routes while client devices are utilizing public transit vehicles. For example, conventional systems inaccurately assume that a client device is stationary and free to move in any direction from its current location. Client devices utilizing public transit vehicles, however, are not stationary and can only move with the public transit vehicles until coming to an upcoming stop. Accordingly, conventional transportation matching systems often generate inaccurate transportation routes for client devices traveling on public transit vehicles. Specifically, conventional systems identify travel routes to the destination from the user's current location. These routes, however, are inaccurate as the user is largely unable to disembark from the public transit vehicle until the next public transit stop at a later time.

Further, as mentioned above, conventional systems provide inaccurate information to client devices during public transit segments. For example, conventional systems often determine a public transit route and then utilize that public transit route (and corresponding information), regardless of changes or delays within public transit segments. Accordingly, when delays occur, such as a delay to the public transit vehicle the user is traveling on or a delay to with respect to a future segment, conventional transportation matching systems often provide outdated, inaccurate information.

Additionally, many conventional systems are rigid and inflexible. For example, as just discussed, many conventional systems are rigid in that they provide static information to a client device that remains constant from the outset of a public route. Conventional systems often require client devices to initiate a new session and submit new travel parameters before providing additional or revised travel information.

As a result of the inflexible approach provided by conventional systems, users commonly perform inefficient, tedious workarounds to receive updated travel information. For instance, users frequently rely on multiple applications and user interfaces to access updated travel information (e.g., open a new application and user interface to identify a public transit schedule, another application to identify the current location, and another application to analyze alternate public transit options). As one example, client devices often switch between mobile applications to obtain up-to-date travel information from third-party sources, which often causes the mobile applications provided by conventional systems to unexpectedly quit or restart. As another example, some users utilize a photo application to temporarily capture and preserve screenshots of the travel information to prevent their travel information from disappearing and being lost.

As indicated above, approaches used by conventional transportation provider systems introduce several inefficiencies. For instance, user workarounds cause undue burdens on a client device in juggling between several mobile applications and interfaces. Further, these workarounds often cause the mobile application associated with a conventional system to crash or restart due to the lack of sufficient real-time memory. This, in turn, causes users to perform additional workarounds or processes that further waste computational resources on their client devices.

In addition, conventional systems cause inefficiencies to client devices when a user re-enters travel parameters. For example, when a user re-enters travel parameters to obtain updated travel information or to recover from a crash, conventional systems needlessly perform duplicative operations to return the same results. Indeed, computing resources of the user's client device and the conventional system are wasted in preforming these repetitive operations. Ultimately, these technical drawbacks and inefficiencies often lead users to navigate to alternative online transportation systems.

In contrast, the transit itinerary system (i.e., the active public transit itinerary system) can provide several technical advantages and benefits over conventional systems. To illustrate, the transit itinerary system can improve the accuracy of operations of computing devices by providing an up-to-date public transit itinerary to client devices. For example, throughout a trip, the transit itinerary system can determine and provide the client device with up-to-date information with respect to vehicles (e.g., public transit vehicles) and segments (e.g., public transit segments) within the public transit itinerary. Thus, unlike conventional systems, the transit itinerary systems can prevent client devices from displaying stale or outdated travel information.

In addition, the transit itinerary system can provide accurate information, even in response to changes or delays in public transit vehicles or segments. Thus, when a client device utilizes an alternate public transit vehicle, a public transit vehicle is delayed, or when the client device requests a change to the public transit itinerary, the transit itinerary system can dynamically update the remaining segments of the public transit itinerary and provide those updates to the client device.

Moreover, the transit itinerary system can provide accurate public transit itineraries to client devices when the client device is traveling on a public transit vehicle. For example, the transit itinerary system can detect a client device traveling on a public transit vehicle and determine one or more public transit itineraries based on the travel data (e.g., one or more transit stops) corresponding to public transit vehicle. To illustrate, the transit itinerary system can provide the alternative public transit itineraries to the client device that are based on the public transit vehicle traveling to the next public transit stop. In this manner, the transit itinerary system can provide the client device with accurate alternate transit itineraries unavailable through other conventional systems.

Further, the transit itinerary system can provide improvements in flexibility over conventional transportation matching systems. Unlike conventional systems that provide static information to a client device, the transit itinerary system can provide user interfaces with enhanced directions and up-to-date information. For example, the transit itinerary system can continuously detect, generate, and provide updated public transit itineraries that adaptively present the client device with more efficient directions to the destination in the form of alternative public transit itineraries. Further, in response to the client device traveling on a public transit vehicle, the transit itinerary system can provide wayfinding information, display notifications with respect to the public transit itinerary, and show visual comparisons between public transit itineraries.

Additionally, the transit itinerary system can provide improvements in efficiency over conventional transportation matching systems. For example, the transit itinerary system reduces the number of user interfaces, user interactions, and applications utilized by implementing client devices. To illustrate, the transit itinerary system can eliminate the need for tedious user workarounds, such as juggling between multiple applications. Indeed, the transit itinerary system can display desired information on a client device in a streamlined user interface that eliminates the need for a user to switch between multiple user interfaces to manually gather travel information (e.g., updated travel information or alternative travel information). As a result, the transit itinerary system can preserve computing resources of client devices, such as real-time memory.

The improvements mentioned above lead to further advancements in efficiency by reducing the time and computing resources required to perform iterative or repetitive processes that plague conventional systems. For example, by providing accurate information devices via user interfaces of a client device, the transit itinerary system can reduce duplicative and wasted resources with respect to providing public transit itineraries. Indeed, providing up-to-date and accurate travel information eliminates the need for a client device to provide transportation requests that include duplicative travel parameters.

Moreover, as mentioned above, the transit itinerary system can provide a streamlined user interface that reduces interactions and time by users of client devices. As described, the transit itinerary system can provide a user interface that automatically updates public transit itineraries. Further, the transit itinerary system can automatically provide alternative public transit itineraries to a client device that is traveling on a public transit vehicle without receiving a transportation request. In addition, the transit itinerary system can provide additional notifications, guidance, and directions to a client device without requiring a user to switch between multiple user interfaces. In this manner, the transit itinerary system seamlessly guides a user to their destination using one or more public transit vehicles with minimal user interaction. The variety of improvements in efficiency further improve user experience and lead fewer client devices to navigate to alternative online transportation systems.

As indicated by the foregoing discussion, the present disclosure utilizes a variety of terms to describe the features and advantages of the transit itinerary system. For example, as used herein, the terms "user," "rider," or "requestor" refers to an individual that utilizes a client device to travel on a public transit vehicle. For instance, a user provides input to the client device to submits a transportation request to the transit itinerary system (i.e., active public transit itinerary system) for a public transit itinerary.

Relatedly, the term "client device" refers to a computing device associated with (or utilized by) a user. In some implementations, a client device includes a client application having instructions that (upon execution) cause the client device to perform various actions for a transit itinerary system, as described herein. Such instructions may likewise cause a client device to present a graphical user interface that includes public transit itineraries, public transit vehicles, public transit routes, public transit stops, and/or other transportation-related information.

As used herein, the term "transportation request" (or simply "request") refers to a digital submission, invitation, or request for transportation services. A transportation request can include a collection of data sent to a transportation matching system comprising information associated with a transportation service sought by a requestor (e.g., pick-up location, drop-off location, transportation mode) as well as the desired transportation mode (e.g., via a public transit vehicle, private ride, shared ride, bike, scooter, bicycle, boat, etc.). In response to a transportation request via at least one public transit vehicle, the transit itinerary system can match the request to one or more public transit vehicles to fulfill the request.

As described above, this disclosure utilizes various terms with respect to public transit. For example, the term "public transit vehicle" (or simply vehicle) refers to a transportation vehicle available to the public (often based on set fares or fees) that runs along pre-planned or fixed routes. Public transportation vehicles are often operated, overseen, or managed by a public or municipal transit authority. In particular, a public transit vehicle travels along a public transit route between established public transit stops, often at scheduled or planned times. Further, a public transit vehicle often accommodates multiple members of the public at one time. Examples of public transit vehicles include trains, busses, trams, trollies, rapid transit, or ferries. In addition, the term "target public transit vehicle" refers to a particular public transit vehicle selected for a public transit itinerary. For example, the target public transit vehicle refers to a public transit vehicle indicated in a public transit itinerary, as described below.

Relatedly, the term "public transit route" (or simply "route") refers to an established path or course for a public transit vehicle. A public transit route often includes a predefined travel path that has a first public transit stop, a last public transit stop, and multiple intermediate public transit stops. As mentioned, public transit vehicles are often scheduled to arrive and depart from public transit stops along a public transit route at scheduled times. Indeed, multiple public transit vehicles can travel along a public transit route picking up and dropping off riders and/or passengers. Further, the term "public transit stop" (or simply "stop") refers to an established location where public transit vehicles board and deboard riders along a public transit route.

Additionally, as used herein the term "public transit segment" (or simply "segment") refers to a portion of a public transit route. A public transit segment can also refer to a portion of a public transit itinerary that utilizes a public transit vehicle. In particular, a public transit route segment includes a travel path between one or more public transit stop along a public transit route that are included within a public transit itinerary. For example, a public transit itinerary can include a public transit segment between public transit stops of a public transit route. In some implementations, a public transit segment also includes a timing element tied to a public transit vehicle that travels the public transit segment at a particular time.

The term "public transit itinerary" (or simply "itinerary"), as used herein, refers to a set of travel information with respect to traveling from a starting location to a destination location utilizing at least one public transit vehicle. For instance, a public transit itinerary can include information (e.g., public transit vehicles, public transit embarkment times, public transit exit times, public transit embarkment locations, public transit exit locations, travel times, transfer locations, etc.) with respect to traveling on a public transit segment of a public transit route on a public transit vehicle. Further, the transit itinerary system can update a public transit itinerary provided to a client device as the client device is traveling along a public transit segment of the public transit itinerary. Often, a public transit itinerary includes multiple public transit segments of multiple public transit routes and multiple public transit vehicles with transfers between the public transit vehicles. In some implementations, in addition to traveling on at least one public transit vehicle, a public transit itinerary also includes traveling on a non-public transit vehicle or manual travel (e.g., riding in a car or walking to a train station).

Relatedly, the term "alternative public transit itinerary" refers to additional public transit itineraries that take the client device to a requested destination. An alternative public transit itinerary can include a different public transit route, public transit segment, and/or public transit vehicle than included in a public transit itinerary selected at the client device.

As used herein, the terms "public transit vehicle travel data" and "vehicle travel data" (or simply "travel data") refer to travel information with respect to a given public transit vehicle. For instance, travel data of a public transit vehicle can include real-time location information, such as the current location, the location and time of the last departed stop, the estimated location and time of the next stop, and delays (e.g., planned and unplanned). Travel data can also include pre-scheduled travel data, such as scheduling location and time of stops as well as historic data (e.g., whether the public transit vehicle regularly runs on-time, early, or late). In addition, travel data can include location data (e.g., real-time, schedule, or historic) with respect to a public transit vehicle. The transit itinerary system can also access, analyze, and process travel data for multiple public transit vehicles. Further, travel data can be part of public transit data (e.g., public transit route information) that the transit itinerary system accesses from a computing device associated with the transit authority that manages the public transit vehicles.

The term "digital signals," as used herein, refers to data associated with a client device. In general, digital signals refer to data provided by, or detected from, a client device. As further described below, client device digital signals can include location information (e.g., GPS location data, Wi-Fi signal data, or cellular location data) and motion information (compass data, acceleration, and deceleration data, and directional data) of a client device. In addition, client device digital signals can include user input, such as a user interacting with the client device to provide positive or negative input with respect to a public transit itinerary and/or a public transit vehicle (e.g., user input confirming that a client device is on a target public transit vehicle). In some implementations, additional computing devices can provide digital signals (e.g., secondary digital signals) corresponding to a client device. For example, a Wi-Fi beacon at a public transit stop or along a public transit route that detects a client device can provide a secondary digital signal. Further, client devices associated with other users can provide secondary digital signals with respect to a public transit vehicle, as described below.

Additional detail will now be provided regarding one or more implementations of the transit itinerary system in relation to illustrate figures. For example, FIG. 1 illustrates a block diagram of a system environment 100 (or "system 100") for implementing a transit itinerary system 106 in accordance with one or more implementations. As shown, the system 100 includes a server device 102 hosting the active public transit itinerary system 106 (or simply "transit itinerary system 106") as part of a transportation matching system 104. The system 100 further includes a client device 108, a public transit device 114, and one or more optional secondary device(s) 122, which can communicate with the transit itinerary system 106/transportation matching system 104 via a network 120.

The server device 102 can include one or more computing devices to implement the transportation matching system 104 and/or the transit itinerary system 106. The client device 108 can include various types of computing devices, such as a mobile computing device. In addition, the public transit device 114 can include one or more computing devices, such as one or more server devices. Further, the one or more optional secondary device(s) 122 include one or more computing devices, such as a Wi-Fi beacon, proximity sensor, or client devices associated with other users. Additional description regarding the illustrated devices (102, 108, 114, and 122), as well as the network 120, is provided with respect to FIGS. 9-10 below.

As illustrated in FIG. 1, the client device 108 includes a client application 110. In various implementations, the client device 108 is associated with a user (e.g., a rider) that is traveling on one or more public transit vehicles. In various implementations, the client application 110 can optionally include computer-executable instructions that, when executed by the client device 108, causes the client device 108 to perform certain functions as described herein. In many implementations, the client application 110 is downloaded, received, accessed, and/or provided (directly or indirectly) from the transit itinerary system 106 and/or transportation matching system 104 on the server device 102.

Additionally, the client device 108 can include client device digital signals 112 (or simply "digital signals 112"). For example, the client device 108 provides the transit itinerary system 106 with one or more digital signals 112 that indicate location data of the client device 108. Additional examples of digital signals 112 are provided below.

Further, FIG. 1 shows the public transit device 114, which includes public transit data 116. As further described below, the public transit data 116 can include information for public transit routes and public transit vehicles. In one or more implementations, the public transit data 116 includes real-time public transit data for the public transit vehicles. The public transit data 116 can also include scheduled location data for the public transit vehicles.

In one or more implementations, the system 100 includes one or more optional secondary device(s) 122 that include secondary digital signals 124. As mentioned above, a secondary device can include wireless beacons that detect the client device 108 and provide corresponding location data (i.e., secondary digital signals 124) to the transit itinerary system 106. In some implementations, the one or more optional secondary device(s) 122 include client devices associated with other users traveling on public transit vehicles. Additional description regarding secondary devices and secondary digital signals 124 is provided below.

As mentioned above, the transit itinerary system 106 utilizes the network 120 to communicate with the client device 108, the public transit device 114, and/or the one or more optional secondary device(s) 122. For example, the transit itinerary system 106 receives a transportation request from the client device 108 to travel to a destination. In response, the transit itinerary system 106 accesses public transit data 116 from the public transit device 114 and provides one or more public transit itineraries to the client device 108.

Further, while the client device 108 is traveling to the destination, the transit itinerary system 106 can utilize the digital signals 112 from the client device 108 and/or the secondary digital signals 124 from the one or more secondary device(s) 122 along with the public transit data 116 to determine that the client device 108 is traveling on a particular public transit vehicle. Based on this determination, the transit itinerary system 106 can proactively or reactively identify and provide the client device 108 with one or more alternative public transit itineraries to the destination.

Although FIG. 1 illustrates the system 100 having a particular number and arrangement of components associated with the transit itinerary system 106, the system 100 may include more or fewer components with varying configurations. For example, the system 100 can include multiple client devices associated with multiple users (e.g., multiple riders). As another example, the transit itinerary system 106 can be implemented on a server device apart from the transportation matching system 104. Additionally, the transit itinerary system can be implemented as a whole or in part on another device (e.g., the client device 108 performs some or all of the functions of the transit itinerary system 106). In some implementations, the transit itinerary system 106 can communicate directly with the one or more optional secondary device(s) 122 (shown as the dashed arrow), bypassing the network 120.

Figure 2:
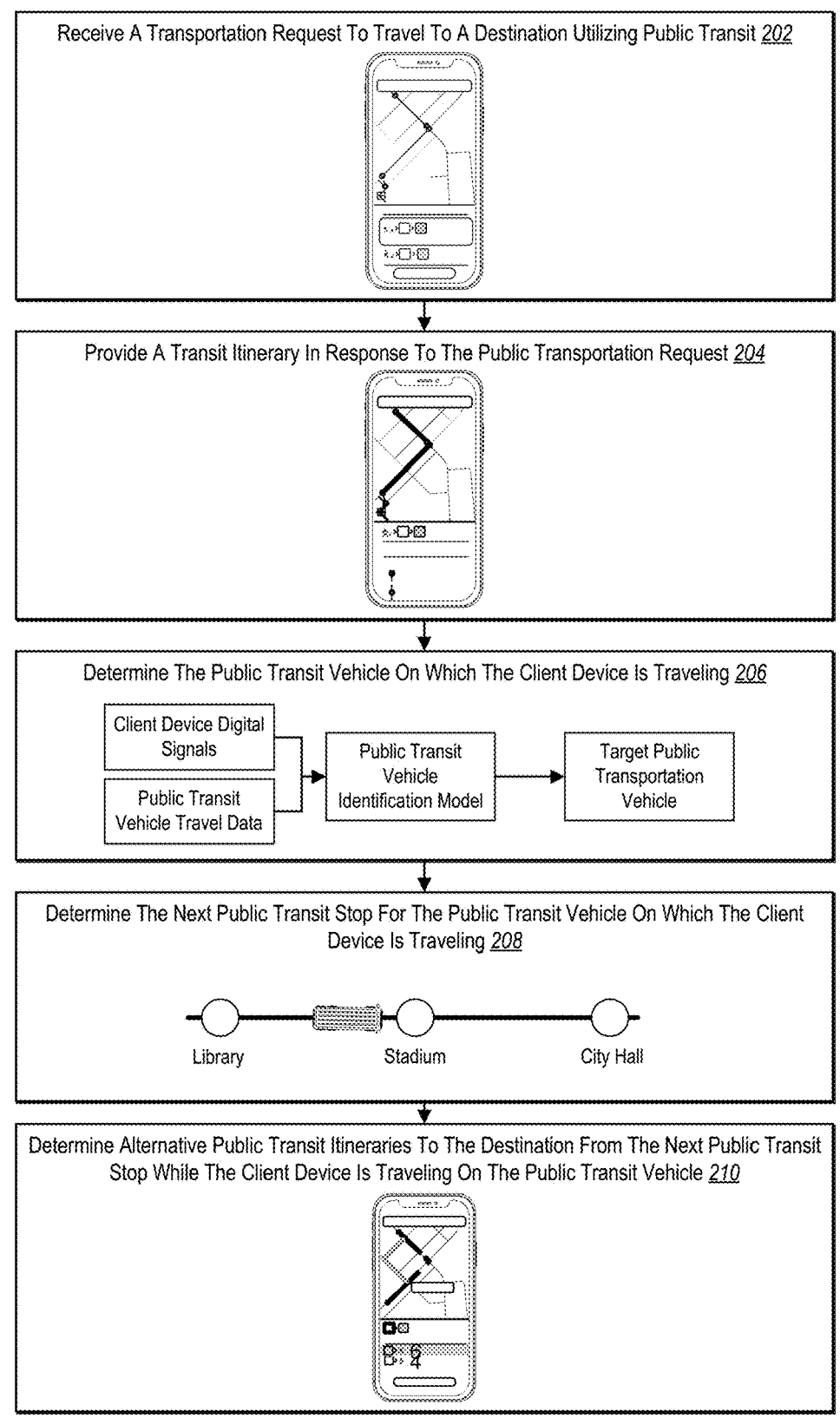
FIG. 2 illustrates an overview of the active public transit itinerary system generating and providing alternative public transit itineraries while a client device is traveling on a public transit vehicle in accordance with one or more implementations.

As mentioned, the transit itinerary system 106 can detect a client device traveling on a public transit vehicle and provide alternative possibilities to reach the destination. To illustrate, FIG. 2 shows an overview of the active public transit itinerary system generating and providing alternative public transit itineraries based on determining that a client device is traveling on a public transit vehicle in accordance with one or more implementations. In particular, FIG. 2 shows a flow diagram of a series of acts 200. In one or more implementations, the transit itinerary system 106 implements the series of acts 200 shown in FIG. 2. In alternative implementations, the transportation matching system 104 can implement one or more acts in the series of acts 200.

As shown, the series of acts 200 includes an act 202 of the transit itinerary system 106 receiving a transportation request to travel to a destination utilizing public transit. For example, a client device associated with a user (e.g., rider) detects user input within a client application (e.g., within a dedicated mobile application or a web-browser) indicating a transportation request for traveling to a destination via public transit. In response, the client device can provide the transportation request to the transit itinerary system 106.

As shown, the series of acts 200 includes an act 204 of the transit itinerary system 106 providing a transit itinerary in response to the transportation request. For instance, the transit itinerary system 106 provides one or more initial public transit itineraries to the client device from which the user can select. For example, when the transit itinerary system 106 provides multiple initial public transit itineraries to the client device, upon detecting a user selection of one of the public transit itineraries, the client device can provide the user selection to the transit itinerary system 106.

As mentioned above, a public transit itinerary can include times and directions for traveling from the current location of the client device to the destination. For example, the directions can include location information (e.g., public transit segments showing where the client device should get on and off), public transit vehicle information (e.g., the particular public transit vehicles the client device should take), and/or timing information (e.g., when a client device should get on and off). Additionally, the client device can display a graphical user interface that includes a map showing public transit routes from the current location of the client device to the destination based on the provided public transit itinerary.

As also shown, the series of acts 200 includes an act 206 of the transit itinerary system 106 determining that public transit vehicle on which the client device is traveling. For example, the transit itinerary system 106 can utilize a public transit vehicle identification model that process the public transit data and that digital signals from the client device to determine the public transit vehicle on which the client device is traveling. In various implementations, the transit itinerary system 106 can detect that the client device is traveling along the public transit route indicated in the public transit itinerary provided to the client device (e.g., the public transit itinerary selected at the client device). In addition, the transit itinerary system 106 can determine the particular public transit vehicle on which the client device is traveling.

In one or more implementations, the transit itinerary system 106 determines that the public transit vehicle (e.g., a target public transit vehicle) in the selected public transit itinerary is the public transit vehicle on which the client device is traveling. In alternative implementations, the transit itinerary system 106 determines that the client device is traveling on another public transit vehicle other than the target public transit vehicle. Additional detail regarding the public transit vehicle identification model and determining the public transit vehicle the client device is traveling on is provided below in connection with FIGS. 3 and 4.

Further, as shown, the series of acts 200 includes an act 208 of the transit itinerary system 106 determining the next public transit stop for the public transit vehicle on which the client device is traveling. For example, in various implementations, the transit itinerary system 106 utilizes the location of the client device and/or the public transit vehicle on which the client device is traveling along with public transit data to identify the next public transit stop of the identified public transit vehicle. In additional implementations, the transit itinerary system 106 also determines the estimated time of arrival (ETA) of the public transit vehicle at the next public transit stop. Additional detail regarding determining the next public transit stop is provided below in connection with FIGS. 3 and 5.

As shown, the series of acts 200 includes an act 210 of the transit itinerary system 106 determining alternative public transit itineraries to the destination from the next public transit stop while the client device is traveling on the public transit vehicle. For example, the transit itinerary system 106 can proactively or reactively determine and provide the client device with alternative public transit itineraries to the destination. Indeed, based on the information that the client device is currently traveling to the next public transit stop on a public transit vehicle, the transit itinerary system 106 can generate updated and accurate alternative public transit itineraries from the next public transit stop at the ETA to the destination.

In various implementations, the transit itinerary system 106 utilizes a public transit itinerary generator to generate the alternative public transit itineraries (as well as the public transit itinerary mentioned above). Further, the transit itinerary system 106 can weight each of the alternative public transit itineraries based on various factors, such as transfer costs. In some implementations, the transit itinerary system 106 can score the public transit itinerary and the (weighted) alternative public transit itineraries to determine if some of the alternative public transit itineraries are preferable to the current public transit itinerary. In these implementations, the transit itinerary system 106 can provide the top-ranked alternative public transit itineraries to the client device. Additional detail regarding the public transit itinerary generator and determining alternative public transit itineraries is provided below in connection with FIGS. 3 and 5.

Figure 3:
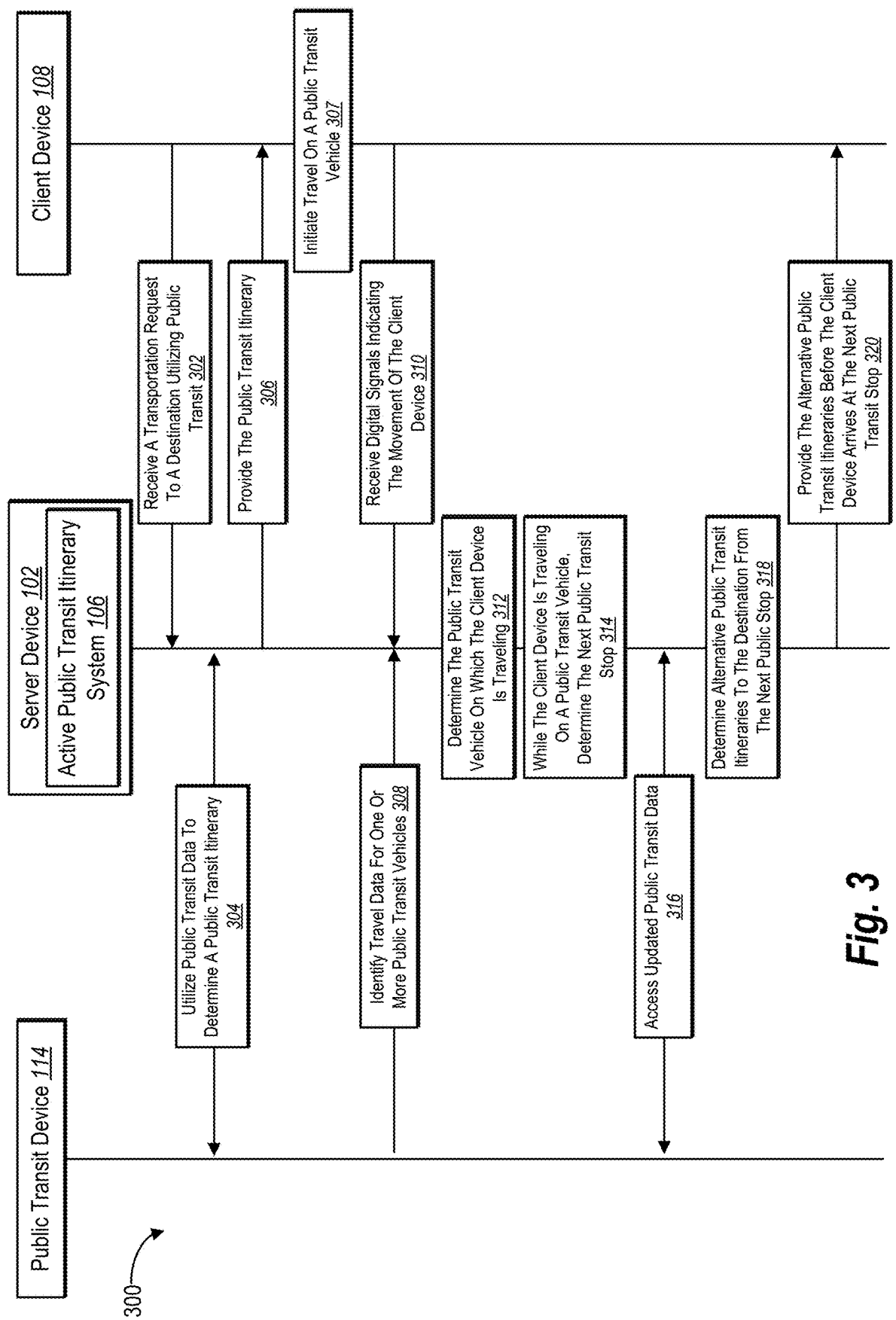
FIG. 3 illustrates a sequence flow diagram of the active public transit itinerary system communicating with a public transit device and a client device to provide alternative public transit itineraries based on a client device traveling on a public transit vehicle in accordance with one or more implementations.

As just described, the transit itinerary system can generate and provide alternative public transit itineraries to the client device based on determining that the client device is traveling on a particular public transit vehicle. FIG. 3 shows a sequence flow diagram of the active public transit itinerary system communicating with a public transit device and a client device to provide alternative public transit itineraries in accordance with one or more embodiments.

As shown, FIG. 3 includes the server device 102 in communication with the client device 108 and the public transit device 114. Further, FIG. 3 includes a series of acts 300 performed by the transit itinerary system 106. While the transit itinerary system 106 is illustrated on the server device 102, as mentioned above, some or all of the transit itinerary system 106 can be located on the client device 108. Indeed, in various implementations, the transit itinerary system 106 can perform the series of acts 300 via the server device 102, the client device 108, or both.

As shown, the series of acts 300 includes an act 302 of the transit itinerary system 106 (via the server device 102) receiving a transportation request to a destination utilizing public transit. Indeed, the client device 108 can provide the transportation request, as described above. For example, the client device 108 receives input from a user (e.g., within a mobile application) selecting public transit as the mode of transportation. Further, the client device 108 can receive input indicating the destination to which the user desires to travel. In additional instances, the client device 108 receives a starting location and/or time if it is different from the client device's current location and/or the current time. Upon collecting input from the user, the client device 108 provides the transportation request to the server device 102.

As shown, the series of acts 300 includes an act 304 of the transit itinerary system 106 (via the server device 102 and the public transit device 114) utilizing public transit data to determine a public transit itinerary. In one or more implementations, the transit itinerary system 106 can access public transit data to identify one or more public transit routes (e.g., bus routes or train lines) that connect to the destination indicated in the transportation request. Further, the transit itinerary system 106 can identify public transit segments (or simply "segments") along the public transit routes that connect the client device to the destination. For example, the transit itinerary system 106 generates a travel path to the destination by linking together a set of segments from multiple public transit routes.

Upon identifying one or more public transit segments, the transit itinerary system 106 can identify public transit vehicles associated with those segments. For example, the transit itinerary system 106 can access the public transit data to identify public transit vehicles that travel along the segments with corresponding travel times. In additional implementations, the transit itinerary system 106 identifies timing information for public transit vehicles at the beginning and end of each public transit segment.

Accordingly, based on this information, the transit itinerary system 106 can generate a public transit itinerary that identifies particular public transit vehicles that travel along the identified segments. Indeed, by determining when public transit vehicles will travel along the identified segments, the transit itinerary system 106 can string together a public transit itinerary that indicates particular public transit vehicles for the client device to take to arrive at the destination.

To illustrate an example, the transit itinerary system 106 identifies a travel path that includes two public transit segments (e.g., train lines). The first segment travels from near the current location of a client device (e.g., a first train stop) to a midpoint (e.g., a second train stop) along a first train route, and the second segment travels from the midpoint to the destination (e.g., a third train stop) along a second train route. Here, the transit itinerary system 106 can use public transit data to identify the next train to leave from the first train stop (e.g., a first train) as well as when the first train will reach the second train stop. Similarly, the transit itinerary system 106 can determine the next train to leave the second train stop after the first train arrives (e.g., a second train) as well as when the second train will arrive at the third train stop. Upon determining this information, the transit itinerary system 106 can generate a public transit itinerary to provide to the client device.

In one or more implementations, the transit itinerary system 106 generates multiple public transit itineraries. For instance, different public transit itineraries can include segments that travel along different public transit routes. In another instance, different public transit itineraries include the same segments, but include different public transit vehicles traveling at different times.

As mentioned previously, a public transit itinerary can include a variety of transportation vehicles (and different transportation modes) in addition to a public transit vehicle. As one example, the transit itinerary system 106 generates an initial segment that includes traveling on a bike or scooter to a public transit stop before starting a second segment, which includes boarding a public transit vehicle. As another example, the transit itinerary system 106 may determine that public transit vehicles do no travel near the requested destination. Accordingly, the transit itinerary system 106 can provide various public transit itineraries that include different transportation modes (e.g., walking or a matched car ride) for completing the last segment to the destination.

In some implementations, the transit itinerary system 106 utilizes a third-party system to retrieve one or more public transit itineraries (or portions thereof). For example, the transit itinerary system 106 queries a third-party system that utilizes public transit data to identify one or more public transit itineraries to the destination. In some implementations, the server device 102 sends a query to the public transit device 114, which returns one or more public transit segments and/or public transit itineraries.

As described further below, the transit itinerary system 106 can weight, score, and/or rank the public transit itineraries. For example, the transit itinerary system 106 applies a transfer cost weight to a segment that requires the client device to transfer to a new public transit vehicle. As another example, the transit itinerary system 106 can rank the public transit itineraries based on features, labels, or categories, such as shortest walking time, shortest overall travel time, fastest time, lowest cost, most on-time/reliable, and/or a weighted combination of such features.

As shown in FIG. 3, the series of acts 300 includes an act 306 of the transit itinerary system 106 (via the server device 102) providing the public transit itinerary to the client device 108. For example, the transit itinerary system 106 can provide the highest-ranked public transit itinerary (e.g., the top three itineraries) to the client device 108. Further, the transit itinerary system 106 can provide an option for the client device 108 to view additional public transit itineraries. The public transit itinerary can also provide public transit itineraries according to the categories or labels mentioned above.

In one or more implementations, the transit itinerary system 106 can cause the client device 108 to display the public transit itinerary within a graphical user interface. For example, the transit itinerary system 106 provides data to the client device 108 that causes the client device 108 to show a public transit itinerary along with a corresponding map showing the public transit segments. An example of a graphical user interface that includes a public transit itinerary is provided below in connection with FIG. 6A.

In additional implementations, the client device 108 provides an indication to the server device 102 that the user has selected the provided public transit itinerary. For example, the client device 108 can receive input from the user selecting one of the provided public transit itineraries. In response, the client device 108 indicates the selection to the transit itinerary system 106. In addition, the client device can provide additional detail regarding the selected public transit itinerary, such as specific travel times and locations. An example of a graphical user interface that includes additional detail with respect to a selected public transit itinerary is provided below in connection with FIG. 6B.

As shown in FIG. 3, the series of acts 300 includes an act 307 of the client device 108 initiating travel on a public transit vehicle. In some implementations, the client device 108 boards the public transit vehicle indicated in the selected public transit itinerary (e.g., a target public transit vehicle). In alternative implementations, the client device 108 boards a different public transit vehicle. For example, the client device 108 misses the bus indicated in the public transit itinerary but boards the next bus traveling along the same segment.

As also shown, the series of acts 300 includes an act 308 of the transit itinerary system 106 (via the server device 102) identifying travel data for one or more public transit vehicles. As provided above, travel data can include location information of public transit vehicles, including real-time and scheduled location information. Specific examples of travel data are provided below in connection with FIG. 4.

In one or more implementations, the transit itinerary system 106 can begin to identify the travel data after the time of the first event indicated in the public transit itinerary passes (e.g., board Train 2 at Stop A at Time X). Additionally, or in the alternative, the transit itinerary system 106 can begin to identify travel data based on detecting movement of the client device 108 (e.g., the client device 108 is traveling away from a public transit stop at a speed commensurate with a public transit vehicle).

In some implementations, the transit itinerary system 106 accesses travel data for the target public transit vehicle (e.g., the public transit vehicle indicated in the public transit itinerary). For example, the transit itinerary system 106 minimizes bandwidth usage by first accessing travel data for a single public transit vehicle (e.g., the target public transit vehicle). If the travel data is later deemed insufficient, the transit itinerary system 106 can access travel data associated with additional public transit vehicles. In alternative implementations, the transit itinerary system 106 accesses travel data associated with multiple public transit vehicles at the same time.

In various implementations, the transit itinerary system 106 can identify travel data for public transit vehicles associated with the public transit segment identified in the public transit itinerary. For instance, the transit itinerary system 106 retrieves travel data for public transit vehicles that travel along the first public transit segment included in the provided public transit itinerary. For example, besides receiving travel data for the target public transit vehicle, as mentioned above, the transit itinerary system 106 can also access travel data for one or more next (and/or previous) public transit vehicles that travel along the public transit segment indicated in the public transit itinerary.

Similarly, the transit itinerary system 106 can identify travel data of public transit vehicles associated with the public transit stop. For example, the transit itinerary system 106 identifies travel data for public transit vehicles that depart from the first public transit stop indicated in the public transit itinerary but that travel along different public transit routes (e.g., within a time frame associated with the target public transit vehicle departing the stop). In this manner, if the client device 108 boarded a public transit vehicle associated with a different public transit route/public transit segment than indicated in the public transit itinerary, then the transit itinerary system 106 can later detect that the client device 108 did not board the target public transit vehicle.

In some implementations, the transit itinerary system 106 can identify travel data for public transit vehicles associated with each of the public transit itineraries provided to the client device 108. For example, the client device 108 does not provide a selection of a public transit itinerary. Alternatively, the client device 108 indicates a selection of a public transit itinerary, but the user determines to follow another public transit itinerary. In any case, the transit itinerary system 106 can identify travel data associated with multiple public transit itineraries to later determine which public transit vehicle the client device 108 is on, as further described below.

In one or more implementations, the transit itinerary system 106 determines one or more public transit vehicles for which to identify travel data based on digital signals from the client device 108. For example, if the transit itinerary system 106 knows the location of the client device 108 at a given time, the transit itinerary system 106 can identify travel data for public transit vehicles proximate to the location at the given time (e.g., with a 0.5-mile radius).

Further, if the transit itinerary system 106 later receives digital signals from the client device 108 after initially retrieving travel data for a set of public transit vehicles, the transit itinerary system 106 can filter out the travel data based on the newly obtained information.

As just mentioned, the transit itinerary system 106 can receive digital signals from the client device 108. To illustrate, the series of acts 300 includes an act 310 of the transit itinerary system 106 receiving digital signals (i.e., client device digital signals) indicating movement of the client device 108. As described in FIG. 4 below in additional detail, digital signals from the client device 108 can include location information, motion information, and/or user input information.

The transit itinerary system 106 can perform the acts 308 and 310 concurrently or in either order. Further, the transit itinerary system 106 can perform the acts 308 and 310 multiple times. For example, the transit itinerary system 106 receives multiple digital signals from the client device 108 on multiple occasions. Also, as mentioned further below, the transit itinerary system 106 can also receive secondary digital signals from devices other than the client device 108 that indicate the movement and location of the client device 108 and/or the movement and location of a public transit vehicle.

As shown, the series of acts 300 includes an act 312 of the transit itinerary system 106 determining the public transit vehicle on which the client device 108 is traveling. For instance, the transit itinerary system 106 utilizes the digital signals from the client device 108 to determine the public transit vehicle on which the client device 108 is traveling. More specifically, the transit itinerary system 106 can match the digital signals with the travel data of the public transit vehicles to identify and/or confirm the public transit vehicle on which the client device 108 is traveling.

To illustrate, in some implementations, the transit itinerary system 106 begins with a pre-determination that the client device 108 is traveling on the target public transit vehicle indicated in the public transit itinerary along the first public transit segment. Then, the transit itinerary system 106 processes the digital signals to confirm that the client device 108 is traveling on the target public transit vehicle. Otherwise, if the transit itinerary system 106 determines that the client device 108 is not traveling on the target public transit vehicle, the transit itinerary system 106 can utilize the travel data of other public transit vehicles (as mentioned above) to determine the public transit vehicle on which the client device 108 is traveling.

In various implementations, the transit itinerary system 106 utilizes a public transit vehicle identification model to determine the public transit vehicle on which the client device 108 is traveling. Additional detail regarding a public transit vehicle identification model and determining the public transit vehicle on which the client device 108 is traveling is provided below in connection with FIG. 4.

As shown, the series of acts 300 includes an act 314 of the transit itinerary system 106 determining the next public transit stop while the client device 108 is traveling on a public transit vehicle. For example, based on determining which public transit vehicle on which the client device 108 is traveling, the client device 108 can detect the location of the public transit vehicle along the public transit segment. The transit itinerary system 106 can then determine the next (or other subsequent) public transit stop for the public transit vehicle by comparing the location of the public transit vehicle to the public transit segment and/or public transit route that along which the public transit vehicle is traveling.

In one or more implementations, the transit itinerary system 106 utilizes the travel data received for the public transit vehicle to determine the next (or subsequent) public transit stop. For example, the travel data indicates the last stop and/or the next stop for the public transit vehicle. In some implementations, the travel data provides the real-time location (or near-real-time location) of the public transit vehicle. In various implementations, the travel data indicates scheduled times when the public transit data is to arrive at various public transit stops along the public transit segment, and the transit itinerary system 106 compares the current time to the travel data to determine the next (or other subsequent) public transit stop for the public transit vehicle. In example implementations, the transit itinerary system 106 utilizes a combination of the above approaches to determine the next public transit stop from the travel data.

In additional or alternative implementations, the transit itinerary system 106 utilizes the location of the client device 108 and/or other client devices to determine the next (or other subsequent) public transit stop. For example, upon confirming that the client device 108 is traveling on the target public transit vehicle along the public transit segment indicated in the public transit itinerary, the transit itinerary system 106 can track the last public transit stop at which the client device 108 passed. Then, based on this information, the transit itinerary system 106 can use public transit data to identify the next public transit stop.

In many implementations, the transit itinerary system 106 maintains a current location of the public transit vehicle and/or client device 108 as the client device 108 travels along each public transit segment. In this manner, the transit itinerary system 106 can constantly track the last and the next public transit stop for the public transit vehicle. For example, the transit itinerary system 106 provides a graphical user interface at the client device 108 that shows one or more previous stops, future stops, and/or a number of intermediate stops. The transit itinerary system 106 can utilize this information to identify the next public transit stop. Also, an example graphical user interface showing the transit itinerary system 106 tracking public transit stop along a public transit segment is shown in FIG. 6C, which is described below.

As shown, the series of acts 300 includes an act 316 of the transit itinerary system 106 accessing updated public transit data 116. For example, the transit itinerary system 106 can query the public transit device 114 (e.g., a transit authority that manages the public transit vehicles) for updated public transit data with respect to the public transit vehicle on which the client device 108 is traveling. Indeed, the transit itinerary system 106 can maintain up-to-date information, such as the real-time location and/or whether any delay notifications have been issued for the public transit vehicle on which the client device 108 is traveling.

In addition, the transit itinerary system 106 can access updated public transit data for public transit vehicles that the client device 108 is scheduled to travel on in the future. For example, the transit itinerary system 106 continuously accesses public transit data for public transit vehicles corresponding to the next public transit segments of the public transit itinerary that on which the client device 108 is to travel. Accordingly, the transit itinerary system 106 can determine whether the current public transit itinerary is on track or whether adjustments should be made.

For example, as updated public transit data is discovered, the transit itinerary system 106 can provide updates to the client device 108. Indeed, the act 316 can occur at any time, and at multiple times as the client device 108 is traveling to the destination. If the transit itinerary system 106 determines that changes to the public transit itinerary are needed, the transit itinerary system 106 can provide the client device 108 with an alternative public transit itinerary.

As shown, the series of acts 300 includes an act 318 of the transit itinerary system 106 determining alternative public transit itineraries to the destination from the next (or other subsequent) public transit stop. Indeed, because the client device 108 is traveling to the next public transit stop, the transit itinerary system 106 can utilize the next public transit stop (or other subsequent public transit stop) as a waypoint from which to generate alternative public transit itineraries. In addition, in various implementations, the transit itinerary system 106 can generate the alternative public transit itineraries at or after the public transit vehicle on which the client device 108 is traveling is estimated to arrive (ETA) at the next public transit stop.

Further, in some implementations, the transit itinerary system 106 can adjust the alternative public transit itineraries to include the current segment of the client device (e.g., from the current location of the client device 108 along the segment to the next public transit stop). For example, the transit itinerary system 106 appends the current segment to the beginning of each alternative public transit itineraries to accurately reflect that the client device 108 is currently traveling on the public transit vehicle. In alternative implementations, the transit itinerary system 106 starts each alternative public transit itinerary from the next public transit stop from the time the public transit vehicle is estimated to arrive there.

In one or more implementations, the transit itinerary system 106 proactively or reactively generates alternative public transit itineraries. For example, while the client device 108 is traveling along the segment of the public transit itinerary, the transit itinerary system 106 proactively (automatically and without the client device 108 providing any requests for alternative public transit itineraries) determines one or more alternative public transit itineraries to the destination. In addition, the transit itinerary system 106 can analyze, score, and/or rank each of the alternative public transit itineraries to determine which, if any, to provide to the client device 108, as further described below with respect to FIG. 5.

In some implementations, the transit itinerary system 106 reactively determines alternative public transit itineraries in response to the client device 108 providing a request for alternative public transit itineraries. For example, a user on their journey wonders if a better public transit itinerary exists and/or what other options besides public transit are available. In response to detecting corresponding user input, the client device 108 submits a transportation request to the transit itinerary system 106 to determine and provide alternative public transit itineraries to the destination.

In various implementations, the transit itinerary system 106 reactively determines alternative public transit itineraries based on other input detected on the client device 108. For example, the transit itinerary system 106 determines that the user is interested in alternative public transit itineraries based on detecting user input searching a map or re-entering the destination within a transportation request. Indeed, while the client device 108 is traveling on the public transit vehicle, the transit itinerary system 106 can analyze detected input to determine that the user is searching for alternative travel possibilities and, in response, provide the client device 108 with the alternative public transit itineraries.

In one or more implementations, the transit itinerary system 106 generates an alternative public transit itinerary that alters and/or updates the current public transit itinerary. For example, based on detecting changes to the public transit itinerary provided to the client device 108, the transit itinerary system 106 can generate one or more alternative public transit itineraries that provide an updated travel path to the destination. In some implementations, the transit itinerary system 106 automatically replaces or updates the public transit itinerary with the alternative public transit itinerary, such as if the alternative public transit itinerary is not changing any of the segments, but updating the public transit vehicles on which the client device 108 is scheduled to travel.

To illustrate, the transit itinerary system 106 determines that the public transit vehicle on which the client device 108 is traveling will not arrive at the next public transit segment on time. Accordingly, the transit itinerary system 106 generates an alternative public transit itinerary that suggests taking the next public transit vehicle traveling along the next segment. As another example, while the client device 108 is traveling along the segment of the public transit itinerary, the transit itinerary system 106 detects that trains along the next segment in the public transit itinerary are behind schedule. Accordingly, the transit itinerary system 106 generates an alternative public transit itinerary changing which train the client device 108 is to take on the next segment of the public transit itinerary.

In one or more implementations, the transit itinerary system 106 determines that the public transit vehicle on which the client device 108 is traveling is too close to the next public transit stop. For example, if the public transit vehicle is currently arriving at a public transit stop, the transit itinerary system 106 can generate alternative public transit itineraries from the following public transit stop. In one or more implementations, if the public transit vehicle is within a threshold time of arriving at the next public transit stop (e.g., 5, 10, 30, or 60 seconds) of arriving at the next public transit stop, the transit itinerary system 106 can utilize the following public transit stop on the public transit segment. The transit itinerary system 106 can also generate alternate public transit itineraries from a variety of subsequent stops along a public transit segment (e.g., analyze the second stop, the third stop, the fourth stop, etc. from a current location along the public transit segment).

In some implementations, the transit itinerary system 106 determines that the client device 108 is waiting at a public transit stop. In these implementations, if the client device 108 is waiting at a public transit stop to transfer to the next public transit vehicle indicated on the public transit itinerary, the transit itinerary system 106 can determine alternative public transit itineraries from the public transit stop.

In various implementations, the transit itinerary system 106 utilizes a public transit itinerary generator to determine alternative public transit itineraries. Additional detail regarding a public transit itinerary generator and determining the alternative public transit itineraries is provided below in connection with FIG. 5.

As shown, the series of acts 300 includes an act 320 of the transit itinerary system 106 providing the alternative public transit itineraries to the client device 108 before the next public transit stop. For example, the transit itinerary system 106 provides one or more of the alternative public transit itineraries to the client device 108 while traveling on the public transit vehicle to the next public transit stop. In this manner, a user can decide whether to switch to following an alternative public transit itinerary or continue following the current public transit itinerary.

When proactively identifying alternative public transit itineraries, the transit itinerary system 106 can determine when to provide a public transit itinerary to the client device. For example, upon determining an alternative public transit itinerary that is shorter, faster, or otherwise more favorable to the public transit itinerary, the transit itinerary system 106 can provide a notification to the client device 108 indicating the alternative public transit itinerary. As another example, the transit itinerary system 106 can identify public transit itineraries which are scored below the public transit itinerary, which the transit itinerary system 106 withholds or hides from the client device unless a request is received from the client device 108 for alternative public transit itineraries.

In various implementations, as mentioned above, the transit itinerary system 106 provides one or more of the alternative public transit itineraries to be displayed within a graphical user interface at the client device 108. For example, based on receiving data associated with the alternative public transit itineraries, the client device 108 displays a graphical user interface that shows the public transit itinerary along with one or more alternative public transit itineraries. An example graphical user interface showing alternative public transit itineraries is provided below with respect to FIGS. 6E and 6F.

Figure 4:
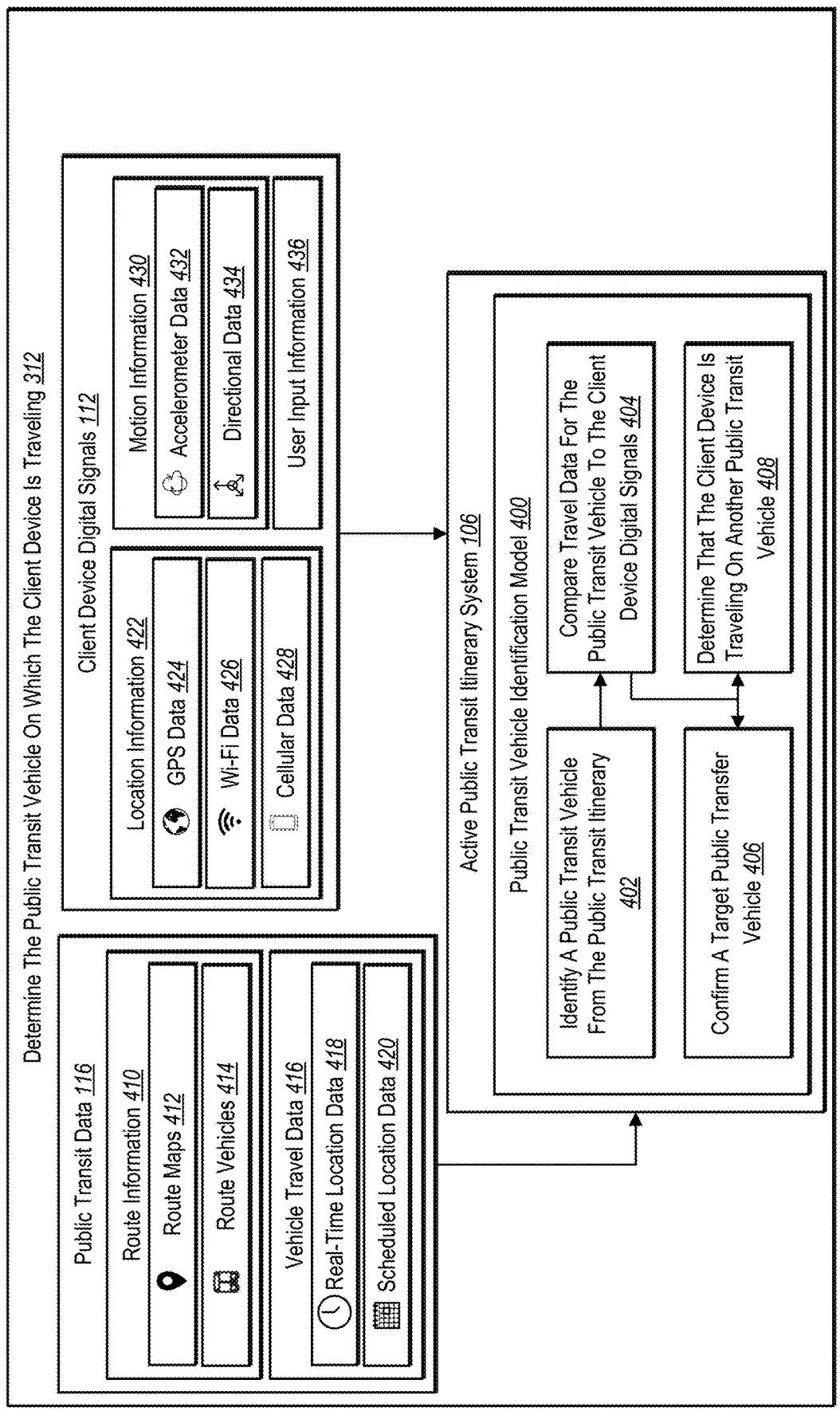
FIG. 4 illustrates a schematic diagram of determining the public transit vehicle on which a client device is traveling, in accordance with one or more implementations.

As mentioned above, in various implementations, the transit itinerary system 106 utilizes a public transit vehicle identification model to determine the public transit vehicle on which the client device 108 is traveling. To illustrate, FIG. 4 shows a schematic diagram of determining the public transit vehicle on which the client device is traveling in accordance with one or more implementations. In particular, FIG. 4 can correspond to the act 312 of the transit itinerary system 106 determining the public transit vehicle on which the client device is traveling.

As shown, FIG. 4 includes the active public transit itinerary system 106 (or simply "transit itinerary system 106") implementing a public transit vehicle identification model 400. The public transit vehicle identification model 400 includes a set of actions that the transit itinerary system 106 can perform for determining the public transit vehicle on which the client device is traveling. In addition, FIG. 4 includes public transit data 116 and the client device digital signals 112 (or simply "digital signals 112") introduced above.

In particular, the public transit data 116 includes route information 410 (i.e., public transit route information), which includes route maps 412 and route vehicles 414 (e.g., public transit vehicle assigned to the public transit routes). In addition, the public transit data 116 includes vehicle travel data 416 (or simply "travel data 416"), which includes real-time location data 418 and scheduled location data 420 of one or more public transit vehicles. The digital signals 112 of the client device includes location information 422 of the client device 108 including GPS data 424, Wi-Fi data 426, and cellular data 428; motion information 430 including accelerometer data 432 and directional data 434; and user input information 436.

As shown in FIG. 4, the public transit vehicle identification model 400 includes an act 402 of identifying a public transit vehicle from the public transit itinerary. Further, the public transit vehicle identification model 400 includes an act 404 of comparing travel data 416 for the public transit vehicle to the digital signals 112 of the client device. Based on the comparison, the transit itinerary system 106 can perform an act 406 of confirming a target public transit vehicle (e.g., confirming the public transit vehicle as the target public transit vehicle). Alternatively, the transit itinerary system 106 can perform the act 408 of determining that the client device is traveling on another public transit vehicle. Each of these acts is described in detail below.

As mentioned, the public transit vehicle identification model 400 includes the act 402 of the transit itinerary system 106 identifying a public transit vehicle from the public transit itinerary. In one or more implementations, the transit itinerary system 106 identifies a target public transit vehicle from the public transit itinerary. For example, the transit itinerary system 106 identifies the target public transit vehicle as the first public transit vehicle indicated in the public transit itinerary selected at the client device. In many implementations, the transit itinerary system 106 infers that the client device is traveling on the target public transit vehicle.

To illustrate, the transit itinerary system 106 can provide a public transit itinerary to the client device in response to a transportation request, as explained above. The public transit itinerary can include one or more public transit segments to travel along as well as when particular public transit vehicles will be traveling along the segments. In these implementations, the transit itinerary system 106 can identify the target public transit vehicle as the first public transit vehicle on which the client device is to travel. For example, if the first segment of the public transit itinerary includes traveling on Bus 1 at Time X from Stop A, the transit itinerary system 106 identifies Bus 1 as the target public transit vehicle. If the first segment in the public transit itinerary includes walking to a public transit stop at a first segment, then the transit itinerary system 106 identifies the target public transit vehicle as the public transit vehicle that the client device is to board to at the beginning of the second segment of the public transit itinerary.

Based on inferring that the client device is traveling on the target public transit vehicle, the transit itinerary system 106 can confirm this inference. For example, as mentioned above, the public transit vehicle identification model 400 includes the act 404 of the transit itinerary system 106 comparing travel data for the public transit vehicle (e.g., the target public transit vehicle) to the client device digital signals. Indeed, the transit itinerary system 106 can compare any combination of travel data 416 for the target public transit vehicle to the digital signals 112 of the client device. Based on one or more comparisons, the transit itinerary system 106 can confirm the inference that the client device is traveling on the target public transit vehicle (e.g., the act 406) or determine that the client device is traveling on another public transit vehicle (e.g., the act 408).

In some implementations, upon inferring that the client device is traveling on the target public transit vehicle, the transit itinerary system 106 determines an initial probability that the client device is traveling on the target public transit vehicle. Then, as pieces of travel data 416 of the target public transit vehicle are matched/compared with pieces of the digital signals 112 of the client device, the transit itinerary system 106 can increase the probability until a threshold probability is satisfied, such that the transit itinerary system 106 confirms the target public transit vehicle.

In comparing the travel data 416 of the target public transit vehicle to the digital signals 112 of the client device, in one or more implementations, the transit itinerary system 106 compares the location of the target public transit vehicle to the location of the client device to determine if their locations overlap for one or more given timeframes. As shown, the travel data 416 of the target public transit vehicle can include the real-time location data 418 and/or the scheduled location data 420. In various implementations, the real-time location data 418 often allows the transit itinerary system 106 to pinpoint a precise location of the target public transit vehicle with respect to a given time. Thus, for target public transit vehicles that provide access to their real-time location data 418, the transit itinerary system 106 can accurately identify their locations.

Additionally, or in the alternative, the transit itinerary system 106 can utilize the scheduled location data 420 to determine the location of a target public transit vehicle. To illustrate, in one or more implementations, the scheduled location data 420 enables the transit itinerary system 106 to estimate a range of locations where the target public transit vehicle may be. For example, for any given time, the transit itinerary system 106 utilizes the public transit vehicle timing information from the scheduled location data 420 to determine that the target public transit vehicle is at a particular public transit stop or traveling in between two public transit stops within the public transit segment. In the latter case, the transit itinerary system 106 can use the proportion of time between the two public transit stops to estimate a more precise location of the target public transit vehicle between the two public transit stops.

In some implementations, the transit itinerary system 106 can expand the location of the target public transit vehicle to include additional portions along the public transit segment to account for the public transit vehicle running behind or ahead of schedule. In one or more implementations, the transit itinerary system 106 can utilize historical data to determine whether the target public transit vehicle typically runs ahead or behind schedule in similar circumstances (e.g., time and day, weather, traffic conditions, etc.). Based on this historic data, the transit itinerary system 106 can better estimate a precise location for the target public transit vehicle.

As mentioned above, the transit itinerary system 106 can compare the location of the target public transit vehicle with the digital signals 112 of the client device to determine whether the client device is traveling on the target public transit vehicle. For example, the transit itinerary system 106 compares the location of the client device determined from the location information 422 (e.g., the GPS data 424, the Wi-Fi data 426 and/or the cellular data 428) of the client device with location information of the target public transit vehicle (e.g., the real-time location data 418 and/or the scheduled location data 420) to determine overlapping locations. If a location overlap exists within the same timeframe, the transit itinerary system 106 can determine that the client device is traveling on the target public transit vehicle.

Otherwise, if the locations do not overlap, the transit itinerary system 106 can determine that the client device is traveling on another public transit vehicle (e.g., a new target public transit vehicle). In these implementations, the transit itinerary system 106 can perform the additional action (e.g., the act 408) of determining the public transit vehicle on which the client device is traveling. For instance, the transit itinerary system 106 can access the route information 410 from the public transit data 116 to identify one or more public transit vehicles that are traveling along the public transit segment indicated in the public transit itinerary, such as the next public transit vehicle traveling along the segment. For the one or more of the public transit vehicles associated with the segment, the transit itinerary system 106 can access and compare their corresponding travel data 416 to the location information 422 of the client device to detect whether a location overlap exists (e.g., repeat the act 404). If a location overlap is found, the transit itinerary system 106 can identify the public transit vehicle on which the client device is traveling. In some implementations, the transit itinerary system 106 assigns this public transit vehicle as the target public transit vehicle and/or updates the public transit itinerary, as described below.

In some implementations, upon failing to confirm the target public transit vehicle as the public transit vehicle on which the client device is traveling, the transit itinerary system 106 can compare the location information 422 of the client device to current locations of public transit vehicles (e.g., utilizing the public transit data 116). For example, the transit itinerary system 106 utilizes the current location of the client device to identify public transit vehicles with a threshold distance to the client device. For these public transit vehicles, the transit itinerary system 106 can compare their corresponding travel data 416 to determine whether location overlap exists, as described above.

In some implementations, the transit itinerary system 106 verifies that the location of the target public transit vehicle matches that of the client device across multiple locations and/or multiple points in time. For example, the transit itinerary system 106 determines that the locations remain overlapped across a threshold time period (e.g., 30 seconds, 1 minute, or 2 minutes). Similarly, the transit itinerary system 106 can determine that the locations remain overlapped at two or more locations separated by a threshold distance (e.g., one-half mile). Further, the transit itinerary system 106 can periodically compare location information between the travel data 416 of the target public transit vehicle and the digital signals 112 of the client device to continue to confirm that the client device is traveling on the target public transit vehicle.

In some implementations, the transit itinerary system 106 does not have access to the location information 422. In some implementations, the transit itinerary system 106 can compare the motion information 430 of the client device to the travel data 416 of the target public transit vehicle. As mentioned above, the motion information 430 of the client device includes the accelerometer data 432 and the directional data 434. The accelerometer data 432 can indicate how fast the client device is moving and the directional data 434 (e.g., compass data) can indicate the direction of movement of the client device.

To illustrate, in one or more implementations, the transit itinerary system 106 determines from the accelerometer data 432 the times when the client device accelerates and decelerates. Further, transit itinerary system 106 determines from the travel data 416 times with the target public transit vehicle arrives at and departs from public transit stops along the public transit segment as well as speeds at which the public transit vehicle is estimated to be traveling. With the real-time location data or historic location data, the transit itinerary system 106 may also be able to identify times when the target public transit vehicle (e.g., a bus) is stuck in traffic or stops at stop signs and traffic signals. In these implementations, the transit itinerary system 106 can compare the accelerometer data 432 from the client device with estimated accelerometer data from the travel data 416 of the target public transit vehicle at corresponding times to determine if a match exists. If the client device and the target public transit vehicle have similar accelerometer data at approximately the same time, the transit itinerary system 106 can determine that the client device is traveling on the target public transit vehicle.

Similarly, in one or more implementations, the transit itinerary system 106 can compare the directional data 434 of the client device with directional data of the target public transit vehicle. For example, the transit itinerary system 106 utilizes the travel data 416 of the target public transit vehicle to determine the location of the target public transit vehicle. In additional implementations, the transit itinerary system 106 can also access the route maps 412 of the target public transit vehicle along the public transit segment to determine the direction the target public transit vehicle is traveling at different times. Then, the transit itinerary system 106 can compare the directional data between the client device and the target public transit vehicle to confirm whether the client device is traveling on the target public transit vehicle.

In instances where the transit itinerary system 106 cannot confirm the target public transit vehicle based on the motion information 430 of the client device, the transit itinerary system 106 can determine another public transit vehicle on which the client device is traveling. For example, as mentioned above, the transit itinerary system 106 can identify one or more public transit vehicles on which the client device is likely to be traveling, access their travel data 416, and compare estimated motion information of the identified public transit vehicles to the motion information 430 of the client device to determine if a match exists. The transit itinerary system 106 can continue to access travel data 416 for additional public transit vehicles until a match is identified.

As also shown, the digital signals 112 include user input information. For example, the client device can receive user input that the transit itinerary system 106 utilizes to confirm the target public transit vehicle or identify a different public transit vehicle. To illustrate, in some implementations, the client device receives input from a user confirming that they boarded the target public transit vehicle indicated in the public transit itinerary. In alternative implementations, the client device receives user input indicating that the user missed the target public transit vehicle and/or is boarding the next public transit vehicle traveling along the public transit segment indicated in the public transit itinerary.

In some implementations, the transit itinerary system 106 can send a message to the client device prompting the user to manually confirm that they boarded the target public transit vehicle. If the client device receives a negative response, the transit itinerary system 106 can further prompt the user on which public transit vehicle they are currently traveling. Indeed, if the transit itinerary system 106 is unable to determine the public transit vehicle on which the client device is traveling, the transit itinerary system 106 can send a prompt to the client device for user input information 436.

In various implementations, the transit itinerary system 106 can utilize multiple digital signals to confirm that the client device is traveling on the target public transit vehicle or determine which public transit vehicle on which the client device is traveling. For example, the transit itinerary system 106 compares both the location information 422 and the motion information 430 of the client device to the travel data 416 of the target public transit vehicle to confirm the target public transit vehicle.

In some implementations, the transit itinerary system 106 can improve the public transit vehicle identification model by utilizing one set of digital signals 112 to improve the prediction of another set of digital signals 112. For example, confirming that the client device is traveling on the target public transit vehicle based on receiving user input information 436, the transit itinerary system 106 can determine to compare the motion information 430 between the client device and the target public transit vehicle. Utilizing the knowledge that the target public transit vehicle is confirmed, the transit itinerary system 106 can utilize the motion information 430 of the client device to better estimate corresponding motion information of the target public transit vehicle. In this manner, the transit itinerary system 106 will be able to more accurately match estimated motion information of the target public transit vehicle (or another public transit vehicle) to the motion information 430 of the client device.

Additionally, while not illustrated, the transit itinerary system 106 can utilize secondary digital signals to confirm (or further confirm) the target public transit vehicle. As mentioned above, secondary devices such as Wi-Fi or proximity beacons can provide secondary digital signals to the transit itinerary system 106 upon detecting the client device. For example, a public transit stop includes a Wi-Fi beacon. If the Wi-Fi beacon detects the client device briefly communicating with it at the same time as the target public transit vehicle passing by the public transit stop, the transit itinerary system 106 can use this information to confirm the target public transit vehicle. In some implementations, the transit itinerary system 106 can identify a Wi-Fi beacon associated with the target public transit vehicle (e.g., on-board Wi-Fi) when the client device is communicating with the transit itinerary system 106 via the beacon. Upon identifying the Wi-Fi beacon, the transit itinerary system 106 can confirm that the client device is traveling on the target public transit vehicle.

Similarly, the transit itinerary system 106 can receive secondary digital signals for client devices confirmed to be on the target public transit vehicle (or another public transit vehicle). For example, a second client device associated with another user detects user input information indicated that the second client device is traveling on the target public transit vehicle (or another public transit vehicle). In response, the transit itinerary system 106 can compare the location information 422 and/or the motion information 430 of the client device and the second client device to determine if one or more matches occur. If the client device shares similar digital signals with the second client device, the transit itinerary system 106 can confirm that the client device is also traveling on the target public transit vehicle (or another public transit vehicle).

In some implementations, the transit itinerary system 106 automatically detects when the client device is traveling on a public transit vehicle. For example, the client device does not submit an initial transportation request. However, the transit itinerary system 106 can determine from the digital signals 112 of the client device that it is traveling on a vehicle. Further, the transit itinerary system 106 can process the digital signals 112 to determine that the client device is traveling on a public transit vehicle. Indeed, the transit itinerary system 106 can utilize the public transit itinerary identification model, as described above, to identify a public transit vehicle on which the client device is traveling.

In various implementations, public transit vehicle identification model 400 can include a machine-learning model. For example, the transit itinerary system 106 utilizes a public transit vehicle machine-learning model that predicts the public transit vehicle on which the client device is traveling from the digital signals 112 and the public transit data 116. Indeed, given one or more inputs of the digital signals 112 and the public transit data 116, the public transit vehicle machine-learning model generates probabilities for multiple public transit vehicles and selects the public transit vehicle with the highest probability as the public transit vehicle on which the client device 108 is traveling.

In these implementations, the transit itinerary system 106 can train the public transit vehicle machine-learning model using training data comprising digital signals, the public transit data, and ground truth public transit vehicles (e.g., historically gathered data). For example, based on the various combinations of digital signals, the transit itinerary system 106 iteratively trains the public transit vehicle machine-learning model in a supervised manner to correctly predict the public transit vehicle on which a client device is traveling. Specifically, the transit itinerary system 106 can analyze the training data utilizing the public transit vehicle machine-learning model to predict a public transit vehicle. The transit itinerary system 106 can compare the predicted public transit vehicle with a ground truth public transit vehicle (using a loss function) and learn internal parameters of the public transit vehicle machine-learning model based on the comparison (e.g., by back-propagating a measure of loss). In various implementations, the public transit vehicle machine-learning model can include a linear regression model, a logistical regression model, a random forest models, a support vector machine (SVG) model, a neural network (e.g., a convolutional neural network or a recurrent neural network), or a decision tree model.

Figure 5:
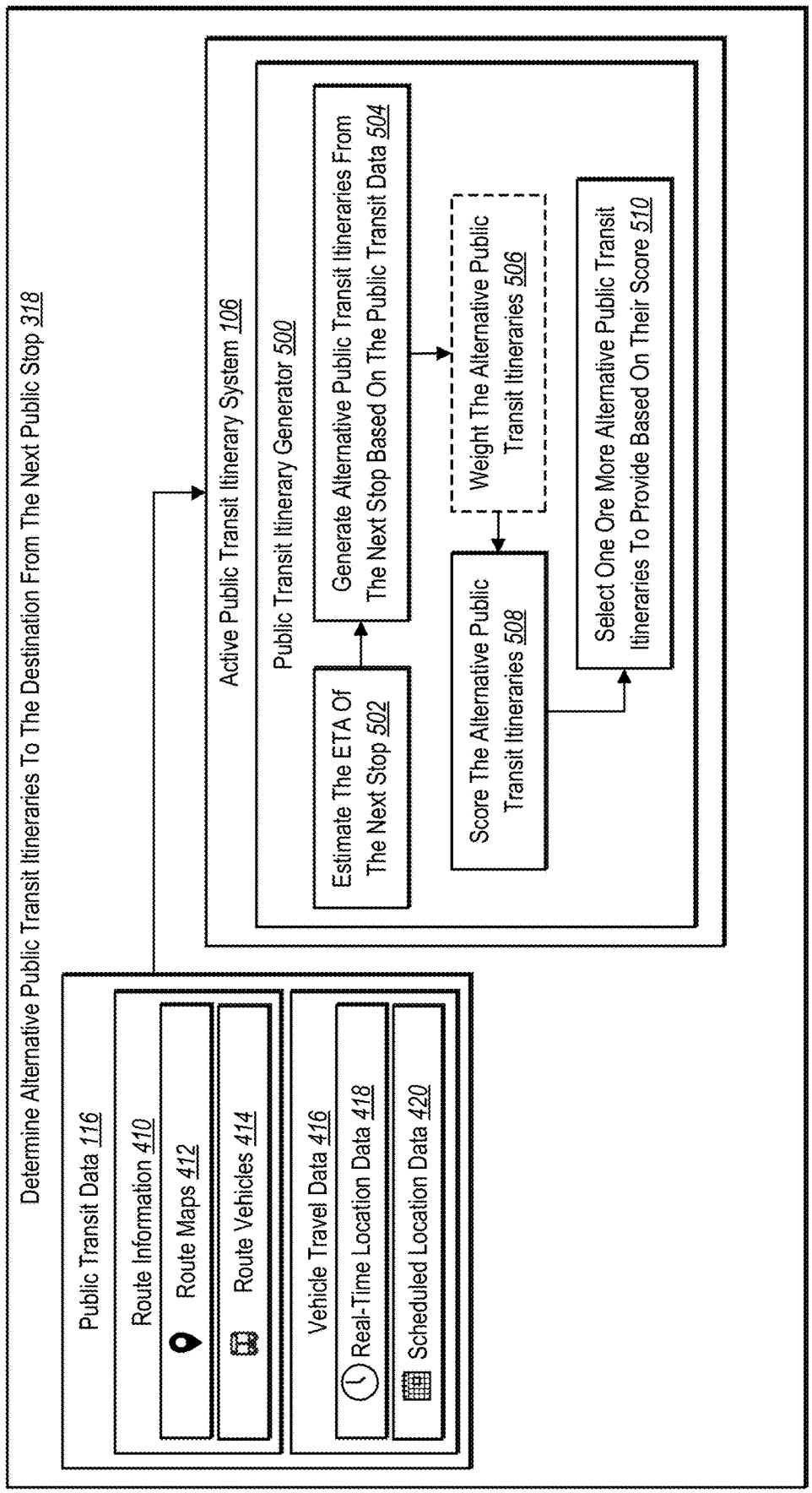
FIG. 5 illustrates a schematic diagram of determining alternative public transit itineraries to the destination from the next public transit stop in accordance with one or more implementations.

As mentioned above, in various implementations, the transit itinerary system 106 utilizes a public transit itinerary generator to determine one or more alternative public transit itineraries. To illustrate, FIG. 5 shows a schematic diagram of determining alternative public transit itineraries to the destination from the next public transit stop in accordance with one or more implementations. In particular, FIG. 5 shows a detailed expansion of the act 318 in FIG. 3 of the transit itinerary system 106 determining alternative public transit itineraries to the destination from the next public transit stop.

As shown, FIG. 5 includes the active public transit itinerary system 106 (or simply "transit itinerary system 106") implementing a public transit itinerary generator 500 in accordance with one or more embodiments. The public transit itinerary generator 500 includes a set of actions that the transit itinerary system 106 can perform for generating alternative public transit itineraries. In addition, FIG. 5 includes the public transit data 116, which is introduced in connection with FIG. 1 and further described in connection with FIG. 4. Indeed, as previously described, the public transit data 116 includes route information 410, which includes the route maps 412 and the corresponding route vehicles 414. In addition, the public transit data 116 includes the vehicle travel data 416 (or simply "travel data 416"), which includes the real-time location data 418 and the scheduled location data 420.

As shown in FIG. 5, the public transit itinerary generator 500 includes an act 502 of estimating the ETA (estimated time of arrival) at the next stop (i.e., the next public transit stop). The public transit itinerary generator 500 also includes an act 504 of generating alternative public transit itineraries from the next stop based on the public transit data 116. In addition, the public transit itinerary generator 500 includes an optional act 506 of weighting the alternative public transit itineraries. Further, the public transit itinerary generator 500 includes an act 508 of scoring the alternative public transit itineraries as well as an act 510 of selecting one or more alternative public transit itineraries to provide based on the scores.

As mentioned above, the public transit itinerary generator 500 includes the act 502 of the transit itinerary system 106 estimating the ETA of the next stop. As previously disclosed, upon the transit itinerary system 106 confirming the public transit vehicle on which the client device is traveling, the transit itinerary system 106 can identify the next public transit stop of the target public transit vehicle. In one or more implementations, the transit itinerary system 106 utilizes the public transit data 116 to identify the next stop. For example, the transit itinerary system 106 compares the location of the public transit vehicle (e.g., obtained from the travel data 416 for the public transit vehicle) within the route maps 412 to identify the next stop.

Additionally, the transit itinerary system 106 can utilize the public transit data 116 to also determine the ETA of the public transit vehicle. For instance, in one or more implementations, the transit itinerary system 106 accesses the scheduled location data 420 from the travel data 416 for the public transit vehicle to identify when the public transit vehicle is scheduled to arrive at the next stop. In additional implementations, the transit itinerary system 106 can utilize historical data to determine whether the ETA indicated in the scheduled location data 420 is accurate. For example, by tracking client devices that have previously traveled on the public transit vehicle (or other public transit vehicles that travel the same public transit segment), the transit itinerary system 106 can form historical patterns for the public transit vehicle based on one or more factors (e.g., time of day, days of the week, weather, traffic levels, event happenings, school and work schedules, etc.).

In some implementations, the transit itinerary system 106 determines the ETA based on the real-time location data 418 of the public transit vehicle. For example, the transit itinerary system 106 determines how long the public transit vehicle will take to travel from its current location to the next stop. Further, the transit itinerary system 106 can utilize previously recorded (e.g., historical) real-time location data to determine if the public transit vehicle will arrive ahead or behind the ETA indicated in the scheduled location data 420 for the next stop.

As mentioned above, the public transit itinerary generator 500 includes the act 504 of the transit itinerary system 106 generating alternative public transit itineraries from the next stop based on the public transit data 116. More specifically, as previously disclosed the transit itinerary system 106 determines that the client device is traveling on the public transit vehicle along the public transit segment to the next stop and will arrive at the next stop at the ETA. Accordingly, the transit itinerary system 106 can utilize the next stop and the ETA as a basis for generating alternative public transit itineraries.

To illustrate, in one or more implementations, the transit itinerary system 106 accesses the public transit data 116 to identify one or more public transit routes from the next stop to the destination. For example, the transit itinerary system 106 analyzes route maps 412 from the route information 410 to identify public transit segments of public transit routes that link the next stop to the destination. In addition, the transit itinerary system 106 can utilize the route vehicles 414 and corresponding travel data 416 of those public transit vehicles to identify public transit vehicles that will leave from the next stop after the ETA. Further, if an itinerary includes multiple segments, the transit itinerary system 106 can identify additional public transit vehicles that correspond to the additional segments of the itinerary.

In alternative implementations, instead of utilizing the next stop as the starting point of an alternative public transit itinerary, the transit itinerary system 106 can create a pseudo public transit stop from the current location of the public transit vehicle/client device. For example, this pseudo stop (e.g., a phantom or ghost stop) is limited to the travel option of requiring the client device to travel on the public transit vehicle to the next travel stop. Indeed, in these implementations, each of the alternative public transit itineraries includes the client device automatically traveling to the next stop before having the client device remain on the public transit vehicle or transfer to another public transit vehicle or mode of transportation. Depending on how the transit itinerary system 106 determines public transit itineraries, utilizing this pseudo public transit stop can capitalize on current optimizations and approaches for determining public transit itineraries without requiring extensive re-tooling or re-coding.

In some implementations, as described above, the transit itinerary system 106 utilizes the services of a third-party system to identify segments of an itinerary and/or particular public transit vehicle that travels along those segments. For example, the transit itinerary system 106 provides the next stop as the starting location, the ETA as the starting travel time, and the destination to the third-party system, which can return one or more itineraries and/or segments.

In additional implementations, as previously described, the transit itinerary system 106 utilizes a third-party system to assist in providing alternative public transit itineraries. Indeed, rather than creating a pseudo public transit stop, which may not be recognized by a third-party system, the transit itinerary system 106 can utilize the third-party system to return itineraries between the next stop (at the ETA) to the destination. Then, as mentioned above, the transit itinerary system 106 can add an initial segment to the beginning of the return itineraries to represent the client device currently traveling on the public transit vehicle to the next stop and to fill in any time gaps in the itinerary between the current time and when the public transit vehicle arrives at the next stop.

In some instances, an appended itinerary will include the initial segment of traveling to the next stop on the public transit vehicle and the next segment will indicate boarding the public transit vehicle at the next stop to continue traveling to the destination. In these instances, the transit itinerary system 106 can concatenate or combine the initially appended segment with the first returned segment to indicate that the client device remains on the public transit vehicle at the next stop. In alternative implementations, the transit itinerary system 106 can add a notification that although an itinerary indicates transferring to the public transit vehicle at the next stop, the client device is currently traveling on the public transit vehicle.

As mentioned above, the public transit itinerary generator 500 includes the act 506 of the transit itinerary system 106 optionally weighting the alternative public transit itineraries. For instance, the transit itinerary system 106 can apply a positive and negative weight to one or more of the public transit segments within an alternative public transit itinerary. Additionally, or in the alternative, the transit itinerary system 106 can apply a positive and negative weight to the alternative public transit itinerary based on characteristics of the alternative public transit itinerary.

In some implementations, the transit itinerary system adds a negative transfer cost weight to segments that require the client device to move to a new public transit vehicle between segments of the public transit itinerary. To illustrate, in one or more implementations, the transit itinerary system 106 determines that a segment of an alternative public transit itinerary requires a client device to transfer to a second public transit vehicle from a first different public transit vehicle. In response, the transit itinerary system 106 can add a transfer cost weight to the segment and/or alternative public transit itinerary. If no transfer is required, the transit itinerary system 106 can skip applying a transfer cost weight to a segment.

In additional implementations, the transit itinerary system 106 can increase the transfer cost or apply an additional weight (e.g., a vehicle downgrade cost or a transfer type cost) when the transfer requires moving from one type of public transit vehicle to another type of public transit vehicle (e.g., moving from a train to a bus, or vice-versa). Further, in some implementations, the transit itinerary system 106 can add a transfer cost weight based on the location or time of a transfer. For instance, high-traffic or busy stops may incur a greater transfer cost weight.

In some implementations, the transit itinerary system 106 can apply a vehicle type cost to a segment that includes a particular type of transportation. For example, the transit itinerary system 106 negatively weighs (e.g., applies vehicle type cost) a segment that includes traveling on commuter rail. In various implementations, the transit itinerary system 106 can apply a variable vehicle cost to segments that includes traveling on a public transit vehicle that does not provide the real-time location data 418 or is historically unpredictable. In one or more implementations, the transit itinerary system 106 weighs an alternative public transit itinerary based on other costs, such as requiring walking beyond a threshold time or distance, waiting beyond a threshold waiting time limit, and/or exceeding a travel time to travel distance ratio.

In various implementations, the transit itinerary system 106 can positively weigh segments and/or alternative public transit itineraries. For example, if a public transit vehicle automatically switches between two segments without requiring the client device to get off, then the transit itinerary system 106 can weigh the second segment or the alternative public transit itinerary with a transfer gain. As another example, if an alternative public transit itinerary includes a total walking distance below a minimal threshold walking distance, the transit itinerary system 106 can apply a minimal walking gain. Similarly, the transit itinerary system 106 can weigh segments and/or alternative public transit itineraries with gains based on user preferences being satisfied (e.g., user selected preferences stored within an account indicating that a user likes to avoid certain public transportation modes, avoid walking beyond a certain distance, etc.).

As mentioned above, the public transit itinerary generator 500 includes the act 508 of the transit itinerary system 106 scoring the alternative public transit itineraries. In various implementations, the transit itinerary system 106 can determine one or more scores for each of the public transit itineraries. In some implementations, the transit itinerary system 106 utilizes a heuristic scoring algorithm to score the alternative public transit itineraries.

To illustrate, in one or more implementations, the transit itinerary system 106 utilizes a scoring algorithm that scores each of the alternative public transit itineraries based on one or more factors. For example, the transit itinerary system 106 generates a score based on characteristics of the public transit segments within an itinerary, such as segment length, segment conditions, vehicle type, number of stops, etc. In additional implementations, the transit itinerary system 106 also generates the score based on characteristics of the alternative public transit itinerary, such as overall walking time, the number of transfers, transfer type, total travel time, travel distance, transfer wait time, delays, anticipated traffic, congestion, and/or monetary costs. As mentioned above, in some implementations, the transit itinerary system 106 weighs one or more of the segments or the alternative public transit itinerary before determining a score for an alternative public transit itinerary.

In alternative implementations, the transit itinerary system 106 utilizes a machine-learning model. For instance, the transit itinerary system 106 trains or otherwise obtains an itinerary machine-learning model that predicts public transit itineraries (e.g., predicts scores or probabilities for alternative public transit itineraries). To illustrate, the transit itinerary system 106 utilizes supervisory training to generate an itinerary machine-learning model that scores public transit itineraries based on one or more of the factors mentioned above (e.g., predicts the fastest public transit itinerary, the cheapest public transit itinerary, or the public transit itinerary with the highest passenger rating). For example, the transit itinerary system can utilize a linear regression model, a logistical regression model, a random forest models, a support vector machine (SVG) model, a neural network, or a decision tree model as the itinerary scoring machine-learning model.

In some implementations, the itinerary scoring machine-learning model receives multiple public transit itineraries and outputs a ranking of the itineraries with or without providing explicit scores. In these implementations, the transit itinerary system 106 can include the public transit itinerary currently selected at the client device 108 to rank it with respect to the generated alternative public transit itineraries.

In some implementations, the transit itinerary system 106 can learn (e.g., utilizing the itinerary scoring machine-learning model) to favor or disfavor a factor based on detected user feedback (e.g., based on which public transit itinerary a user selects when presented with multiple public transit itineraries). The detected user feedback can be specific to a particular user, a group of users sharing common characteristics, or to users generally. For example, the transit itinerary system 106 detects that while most users prefer the shortest walking time, a target user prefers lower costs over less walking.

In various implementations, the transit itinerary system 106 can generate multiple scores for an alternative public transit itinerary (e.g., scores based on various categories or labels). For example, the transit itinerary system 106 generates an overall score, a walking time-based score, a total travel time-based score, and/or a monetary cost-based score. When generating a label- or category-specific score for an alternative public transit itinerary, the transit itinerary system 106 can give more weight to a particular factor. For example, for the walking time-based score, the transit itinerary system 106 favors (e.g., weighs) walking time above the other factors.

Upon generating one or more scores for each of the alternative public transit itineraries, the transit itinerary system 106 can rank, order, and/or arrange the alternative public transit itineraries. For example, the transit itinerary system 106 ranks the alternative public transit itineraries based on the overall score. The transit itinerary system 106 can also generate alternative rankings based on different labels or categories, such as ranking the alternative public transit itineraries based on their walking scores.

In some implementations, the act 506 is a sub-act of the act 508 of the transit itinerary system 106 scoring the alternative public transit itineraries. For instance, the transit itinerary system 106 utilizes a scoring algorithm that internally applies positive and negative adjustments (e.g., weights) to segments of an alternative public transit itinerary and/or the alternative public transit itinerary as a whole as part of determining a score for the alternative public transit itinerary.

As shown, the public transit itinerary generator 500 includes the act 510 of the transit itinerary system 106 selecting one or more alternative public transit itineraries to provide based on the scores. Indeed, the transit itinerary system 106 can select a subset of alternative public transit itineraries to provide to the client device from a larger group of alternative public transit itineraries. In some implementations, the transit itinerary system 106 can select a number or percentage of the top-ranked alternative public transit itineraries (e.g., the top five overall itineraries or itineraries in the top 20% of the walking time-based score category).

In one or more implementations, the transit itinerary system 106 can select the subset of alternative public transit itineraries based on the score for the public transit itinerary currently provided to the client device. For example, the transit itinerary system 106 utilizes the same scoring algorithm and/or metrics to score the public transit itinerary provided to the client device (e.g., the itinerary that the client device is currently following). The transit itinerary system 106 then compares the score of the public transit itinerary to the scores of the alternative public transit itineraries.

Additionally, in some implementations, the transit itinerary system 106 selects alternative public transit itineraries with an equal or higher score than the current public transit itinerary. In other implementations, the transit itinerary system 106 selects alternative public transit itineraries that are within a threshold range or percentage (e.g., above and/or below) to the current public transit itinerary. In one or more implementations, the transit itinerary system 106 selects alternative public transit itineraries that are higher (i.e., more favorable) than the current public transit itinerary by at least a threshold percent or value (e.g., at least 10% higher).

In various implementations, the transit itinerary system 106 can determine the subset of alternative public transit itineraries based on additional factors. For example, if the transit itinerary system 106 is providing the alternative public transit itineraries proactively (e.g., automatically and not in response to a request for public transit itineraries), the transit itinerary system 106 can select the alternative public transit itineraries that have a higher score than the current public transit itinerary. In this manner, the transit itinerary system 106 can proactively notify and provide the client device with better or more favorable alternative public transit itineraries.

In contrast, in implementations where the transit itinerary system 106 is selecting alternative public transit itineraries reactively (e.g., in response to the client device requesting the alternative public transit itineraries), the transit itinerary system 106 can select the top n alternative public transit itineraries regardless of their scores relative to the current public transit itinerary. In these implementations, the transit itinerary system 106 can provide the client device with the best alternatives to the public transit itinerary, even if the selected/current public transit itinerary is presently the best available itinerary.

Turning now to FIGS. 6A-6F, additional detail is provided with respect to the transit itinerary system 106 providing various graphical user interfaces to the client device. In particular, FIGS. 6A-6F illustrate graphical user interfaces at a client device 600 that display alternative public transit itineraries in accordance with one or more implementations. Indeed, FIGS. 6A-6F show how the transit itinerary system 106 (and/or the transportation matching system 104) can cause the graphical user interfaces on the client device 600 to update with respect to receiving alternative public transit itineraries.

As shown, FIGS. 6A-6F include a client device 600 (e.g., the client device 108). The client device 600 includes a graphical user interface 602 (or simply "user interface 602") that includes elements, features, graphics, and options for requesting and displaying public transit itineraries. For example, the user interface 602 includes a map portion 604 having a text field 606 for entering transportation request parameters (e.g., pick-up and drop-off locations) as part of inputting a transportation request. The user interface 602 also includes an itinerary portion 605, which includes various elements that can update on the client device 600, as further described below.

As mentioned above, the transit itinerary system 106 can provide a public transit itinerary to a client device in response to a transportation request. For example, as shown in FIG. 6A, the client device 600 detects user input in the text field 606 requesting travel directions to a destination. In addition, the client device 600 detects user input selecting a transportation mode 607 (i.e., public transit or "Transit") from a list of transportation mode options. The client device 600 provides these parameters to the transit itinerary system 106 as part of a transportation request.

In response, the transit itinerary system 106 can provide one or more initial public transit itineraries. To illustrate, the itinerary portion 605 of the user interface 602 shows the client device 600 displaying a list of public transit itineraries 608 provided by the transit itinerary system 106. As shown, the public transit itineraries 608 include a first public transit itinerary 608a and a second public transit itinerary 608b. Each of the public transit itineraries 608 includes multiple public transit segments of a trip, such as walking segments and bus segments. In some implementations, the public transit itineraries 608 can include a train, bike, scooter, car, van, or another segment. The public transit itineraries 608 can also include additional details, such as timing information, cost, and general directions.

In one or more implementations, the client device 600 can detect a user selection of the first public transit itinerary 608a, as indicated by the first public transit itinerary 608a being emphasized in FIG. 6A. In addition, the client device 600 can provide additional travel information in connection with the first public transit itinerary 608a. Further, the client device 600 can display a map associated with the selected public transit itinerary within the map portion 604 of the user interface 602. As shown, the map portion 604 includes segments corresponding to the first public transit itinerary 608a.

If the user is satisfied with the first public transit itinerary 608a, the user can select the get directions element 610 at the bottom of the itinerary portion 605 of the user interface 602 while the first public transit itinerary 608a is selected. In these instances, the client device 600 can detect the selection of the get directions element 610 along with the selection of the first public transit itinerary 608a. In response the client device 600 can notify the transit itinerary system 106 of the selection as well as update the user interface 602 to show directions of the selected first public transit itinerary 608a. Indeed, the client device 600 can provide a digital signal to the transit itinerary system 106 that the user selected the public transit itinerary 612 to travel to the destination, as mentioned above.

Figure 6B:
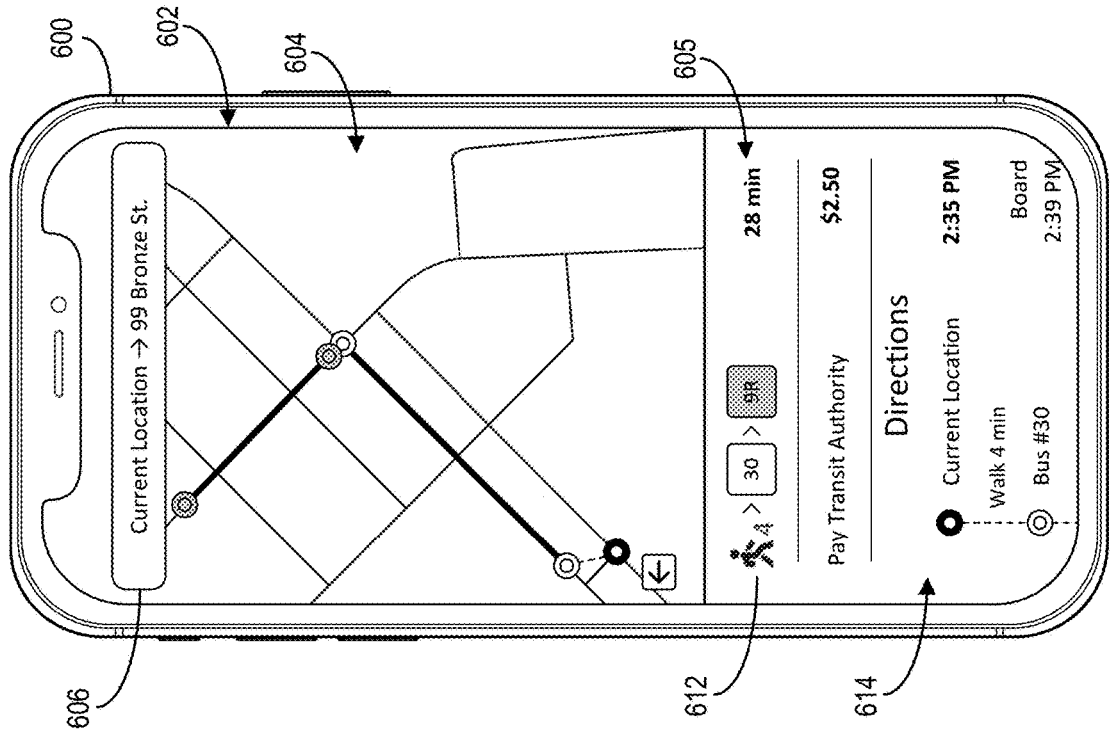
FIGS. 6A-6F illustrate graphical user interfaces displaying alternative public transit itineraries at a client device in accordance with one or more implementations.
Figure 6A:
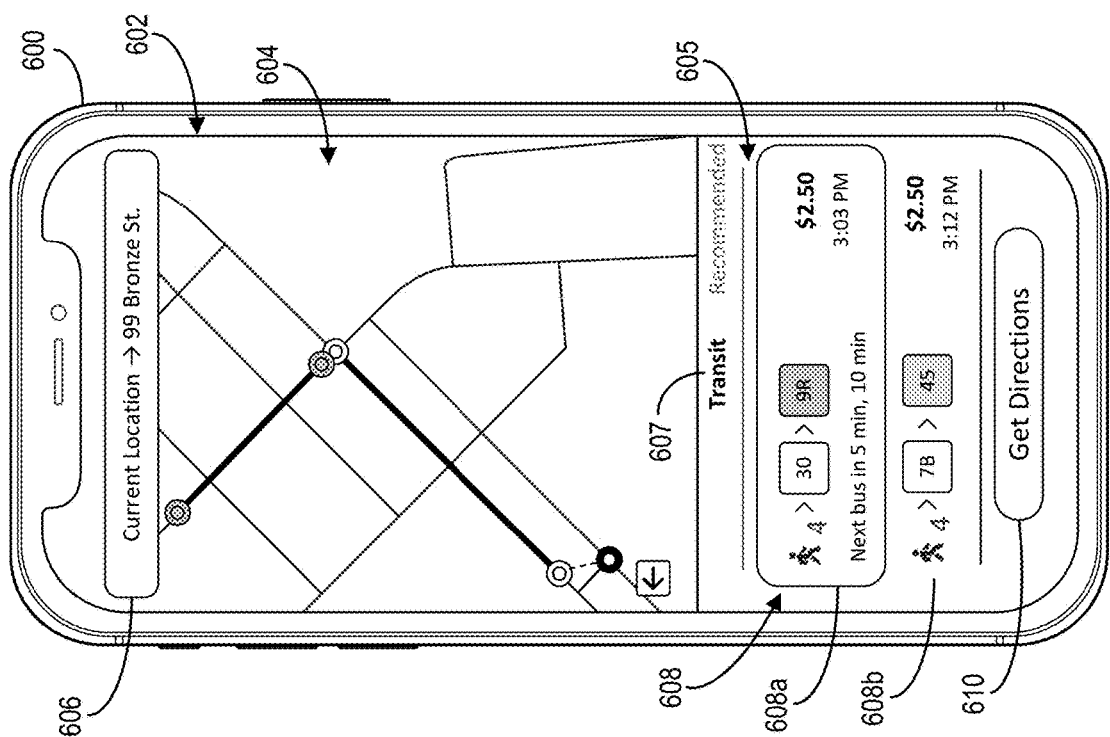

To illustrate, FIG. 6B shows the client device 600 updating the itinerary portion 605 of the user interface 602 to show the selected public transit itinerary 612 as well as directions 614 and travel details with respect to the public transit itinerary. As shown, the directions 614 can include wayfinding guidance that provides step-by-step instructions for traveling along the travel path indicated in the public transit itinerary 612. For example, the directions 614 currently display walking directions to a bus stop where the client device 600 can board Bus #30 at 2:39 pm. In addition, in various implementations, the transit itinerary system 106 can provide additional details with respect to a current or next segment of the public transit itinerary 612.

In one or more implementations, the transit itinerary system 106 can provide wayfinding notifications (e.g., push notifications, text or instant messages, email, etc.) to the client device 600 and/or other devices associated with the user (e.g., a smartwatch or smart glasses). For example, the transit itinerary system 106 provides a wayfinding notification to a client device 600 instructing the client device 600 to not take the bus that is currently arriving, but the next arriving bus. Other examples of wayfinding notifications can include where and when to travel to board a public transit vehicle, which public transit vehicle to board, arrival and departure of a public transit vehicle, when to board and deboard a public transit vehicle, transfer instructions, directions to the next point in the public transit itinerary, how to navigate to the public transit vehicle or another location (e.g., bike docking station) at a public transit stop, and correcting a misstep. In various implementations, the user can set preferences with respect to the type of wayfinding notifications they receive and the amount they wish to receive at the client device 600.

In various implementations, the transit itinerary system 106 provides updates to the client device 600 in connection with the public transit itinerary 612 at regular intervals. For instance, the transit itinerary system 106 monitors the public transit data corresponding to the segments and the public transit vehicles included in the public transit itinerary 612. For example, the transit itinerary system 106 receives real-time location data of the first bus (e.g., Bus #30) as the client device 600 is walking toward the first bus stop and as the client device 600 is traveling on the bus. Based on receiving updates, the transit itinerary system 106 can send data to the transit itinerary system 106 indicating the real-time movements of the first bus. In some implementations, when no updates occur, the transit itinerary system 106 can send an indication to the client device 600 that no changes have been made to the public transit itinerary 612 and/or that the public transit itinerary 612 is up to date.

To illustrate, FIG. 6C shows the client device 600 updating the directions 614 of the public transit itinerary 612 as well as the map portion 604 to show the client device 600 traveling on the first bus (e.g., Bus #30) along the current segment of the public transit itinerary 612. The transit itinerary system 106 causes the client device 600 to display enhanced visual elements and directions to better guide a rider following the public transit itinerary 612 to the destination. Further, as mentioned above, the transit itinerary system 106 can provide real-time and/or regular updates to the client device 600, which enables the client device 600 to continuously update the user interface 602.

In particular, as the client device 600 receives data updates from the transit itinerary system 106, the client device 600 can continually refresh the public transit itinerary 612 (e.g., the directions 614 and the map shown in the map portion 604). For example, if the second bus (e.g., Bus 9R) is running behind schedule, the client device 600 can update the public transit itinerary 612 to reflect the delay in the last segment. Indeed, based on data received from the transit itinerary system 106, the client device 600 can automatically update the public transit itinerary 612 without a user manually requesting a refresh or an update to occur.

In many implementations, the client device 600 can refresh the public transit itinerary 612 in the background even when the client device 600 switches to another mobile application. Further, the client device 600 can continually update the map with the location of the client device as well as the locations of the public transit vehicles that correspond to the public transit itinerary. In this manner, the client device 600 can provide continual guidance and up-to-date information until the client device 600 reaches the destination or cancels the trip. Indeed, the transit itinerary system 106 can reduce anxiety and empower a user by providing easy-to-understand, up-to-date, and accurate directions and visualizations as they travel to the destination.

In one or more implementations, the client device 600 provides one or more options for a user to share their trip with another user. For example, the transit itinerary system 106 causes the client device 600 to include a sharing option where a user can share the public transit itinerary 612 with another user. In some implementations, the client device 600 can also share the user's location and/or progress (or a more limited set of information) as the client device 600 travels toward the destination.

As mentioned above, the transit itinerary system 106 can proactively provide alternative public transit itineraries to the client device 600. To illustrate, FIG. 6C also shows the client device 600 displaying a proactive notification 620 within the user interface 602. As shown, the proactive notification 620 indicates that the transit itinerary system 106 has detected a potentially better public transit itinerary.

To illustrate, as described above, upon determining that a user is traveling on a public transit vehicle (e.g., a target public transit vehicle), the transit itinerary system 106 can automatically, and not in response to an additional transportation request, search for alternative public transit itineraries (e.g., starting at the next public transit stop). Further, the transit itinerary system 106 can utilize weighting and scoring to identify one or more alternative public transit itineraries that are better (e.g., have higher scores) than the public transit itinerary 612 currently being followed by the client device 600.

Similarly, in response to the client device 600 detecting selection of the proactive notification 620, the client device 600 can display one or more alternative public transit itineraries at the client device 600, where the transit itinerary system 106 provides the one or more alternative public transit itineraries to the client device 600 in connection with providing the proactive notification 620. An example of providing alternative public transit itineraries is shown below in FIG. 6E.

Figure 6D:
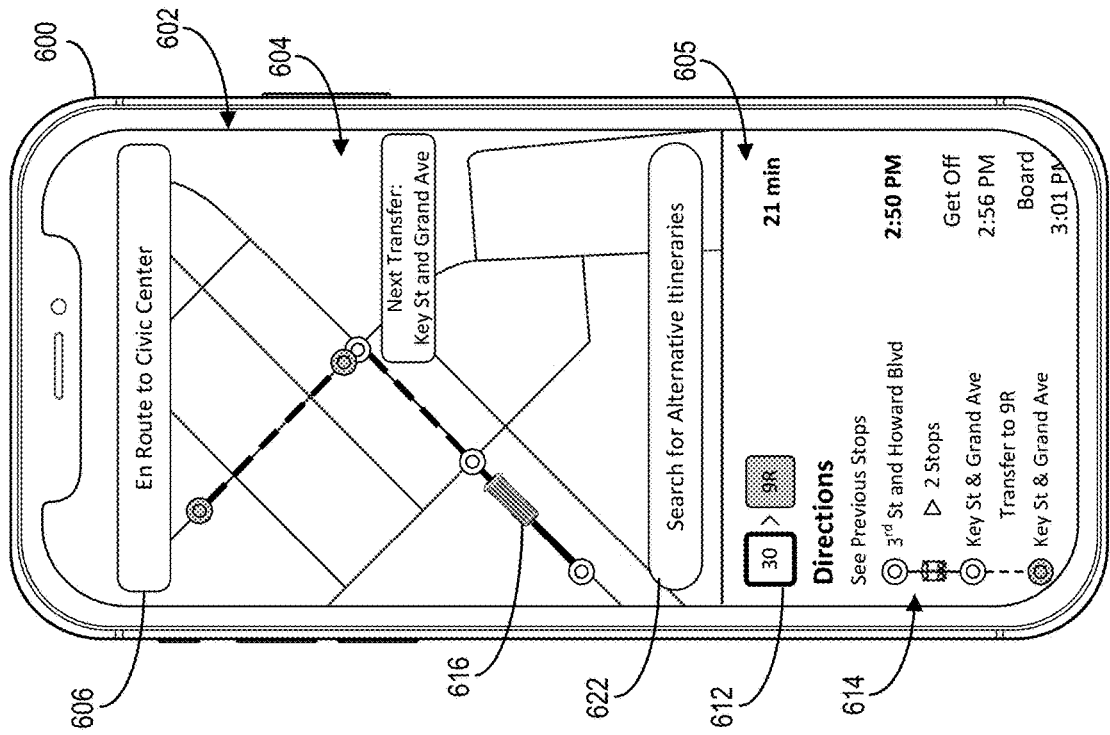
Figure 6C:
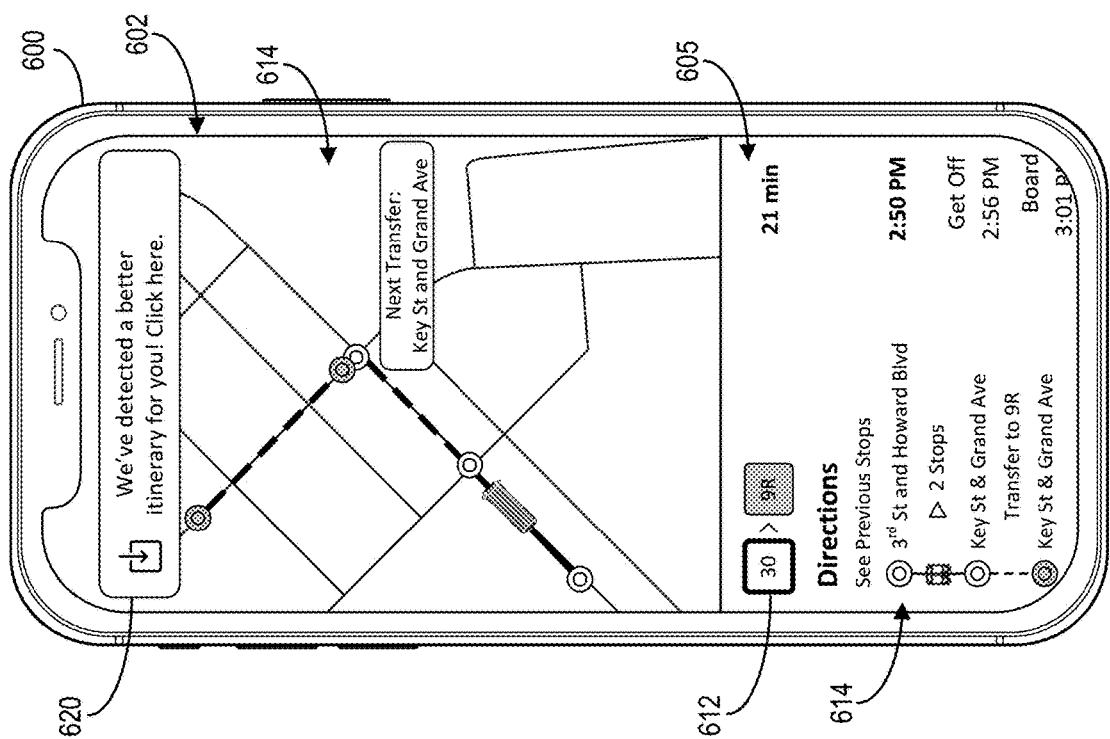

Additionally, or in the alternative, as also mentioned above, the transit itinerary system 106 can reactively provide alternative public transit itineraries to the client device 600. To illustrate, FIG. 6D shows the client device 600 displaying an alternative itinerary search element 622 within the user interface 602. As shown, the alternative itinerary search element 622 enables a user to manually request the transit itinerary system 106 to identify alternative public transit itineraries while the client device 600 is currently traveling on a public transit vehicle.

In response to detecting a selection of the alternative itinerary search element 622, the client device can provide an alternative transportation request to the transit itinerary system 106. In some implementations, the transportation request indicates that the client device 600 is currently traveling on a public transit vehicle 616 as part of a selected public transit itinerary 612. In alternative implementations, the transit itinerary system 106 determines that the client device 600 is traveling on the public transit vehicle 616, as disclosed above. Again, the transit itinerary system 106 can identify and provide one or more alternative public transit itineraries to the client device 600, in response to the alternative transportation request, as detailed previously.

Similarly, in various implementations, the transit itinerary system 106 can allow the client device 600 to submit an updated transportation request (e.g., the user can update or modify the current public transit itinerary 612). For example, while riding on the public transit vehicle, the user decides to travel to a different destination. Upon receiving the user input, the client device 600 provides the updated transportation request to the transit itinerary system 106. In response, the transit itinerary system 106 generates and provides one or more alternative public transit itineraries from the next public transit stop to the new destination. When the public transit itinerary 612 includes future segments, the transit itinerary system can update each of these segments after performing the modification indicated in the updated transportation request.

Figure 6F:
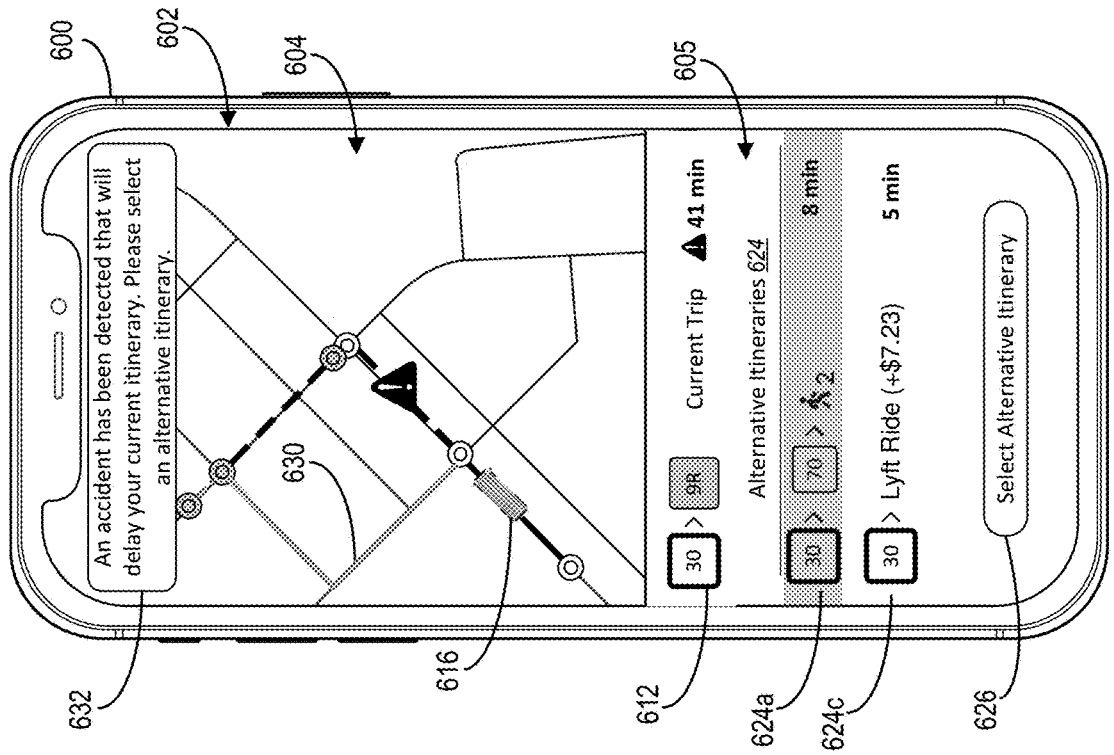
Figure 6E:
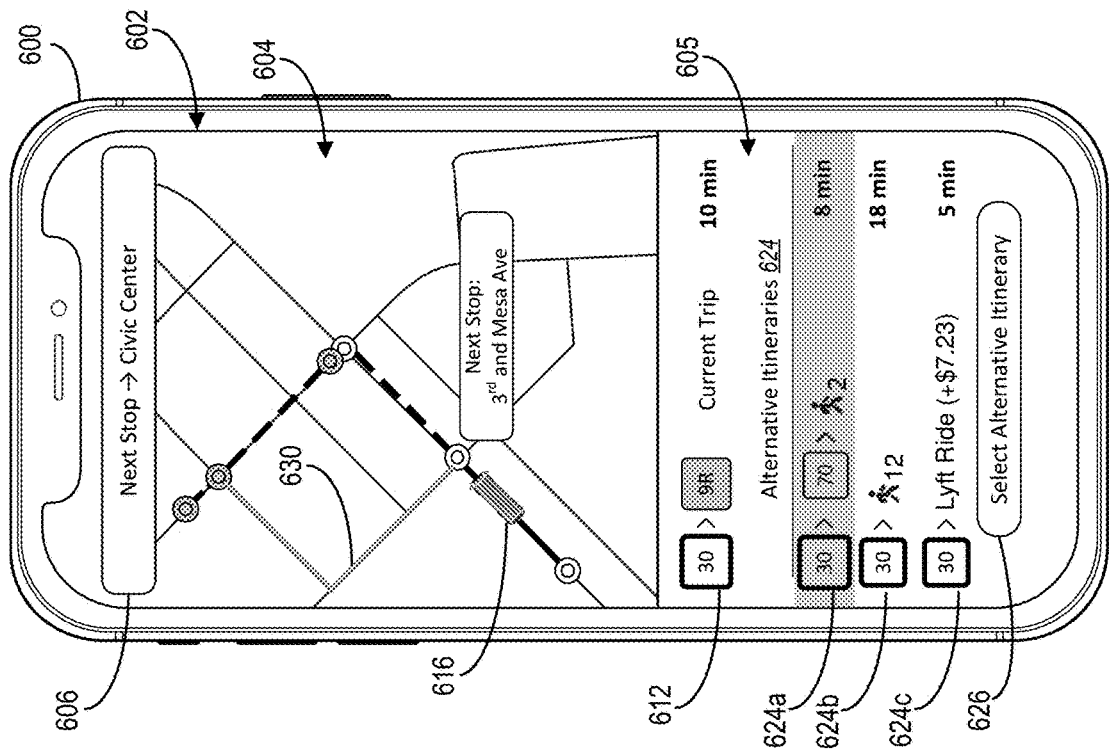

As shown in FIG. 6E, upon receiving the alternative public transit itineraries, the client device 600 can update the itinerary portion 605 of the user interface 602 to display the alternative itineraries 624. As also shown, the alternative itineraries 624 include a first alternative itinerary 624a, a second alternative itinerary 624b, and a third alternative itinerary 624c. In particular, each of the alternative itineraries 624 shows the client device 600 continuing to travel on the first bus (e.g., Bus #30) to at least the next public transit stop. As the next stop, the first alternative itinerary 624a includes transferring to another bus (e.g., Bus #70). The second alternative itinerary 624b has the client device 600 remaining on the first bus for an additional stop before getting off the bus and having the user walk to the destination. The third alternative itinerary 624c includes traveling to the destination via a different mode of transportation (e.g., traveling to the next stop and taking a matched car ride to the destination).

In various implementations, the client device 600 can detect a temporary selection of one of the alternative itineraries 624. For example, as shown, the first alternative itinerary 624a is temporarily selected (indicated by the gray shading). In response, the client device 600 updates the map portion 604, which shows a current travel path of the public transit itinerary 612, to also show an alternative travel path 630 of the first alternative itinerary 624a. In this manner, the client device 600 can provide textual, graphical, and visual comparisons of the currently selected public transit itinerary 612 with the temporary selected first alternative itinerary 624a. Further, the client device 600 can enable a user to expand any of the alternative itineraries 624 to see additional travel information.

As shown, the itinerary portion 605 of the user interface 602 also includes a select alternative itinerary element 626. For example, while the first alternative itinerary 624a is temporarily selected, the client device 600 detects user input selecting the select alternative itinerary element 626. In response, the transit itinerary system 106 updates the client device 600 to show the newly selected public transit itinerary. Indeed, the user interface 602 can update the map portion 604 and the itinerary portion 605 to correspond to the newly selected and implemented public transit itinerary.

As mentioned previously, the transit itinerary system 106 can monitor and provide continuous updates to a currently selected public transit itinerary 612. In some implementations, updating the public transit itinerary 612 requires modifying a segment and/or selecting a different public transit vehicle. In these implementations, the transit itinerary system 106 can provide an alternative public transit itinerary that includes the itinerary modifications. In alternative implementations, the transit itinerary system 106 automatically applies the modifications to the currently selected public transit itinerary 612 without providing an alternative public transit itinerary.

To illustrate, while the client device 600 is traveling on Bus #30 (e.g., the public transit vehicle 616) along the second segment of the public transit itinerary 612, the transit itinerary system 106 detects a delay. Based on the delay, the transit itinerary system 106 determines that the client device 600 will not be able to transfer to the next public transit vehicle at the next segment as indicated in the public transit itinerary 612. Accordingly, the transit itinerary system 106 provides an alternative public transit itinerary to the client device 600 that includes taking the following bus along the next segment. Additionally, the transit itinerary system 106 can also provide other alternative public transit itineraries to the client device 600 to enable the user to determine if they would like to remain on their current travel path and wait for the following bus or take an alternative travel path to the destination (which may include getting off at the next public transit stop).

As another example, FIG. 6F shows the client device 600 displaying an itinerary modification notification 632 within the user interface 602. As shown, the itinerary modification notification 632 indicates that the currently selected public transit itinerary 612 is no longer a viable option. For example, an accident detected along the second segment has added a long delay to the current public transit itinerary. Accordingly, the transit itinerary system 106 provides the client device 600 with alternative itineraries 624 to display, which enables the user to select one of the alternative itineraries 624.

Figure 7:
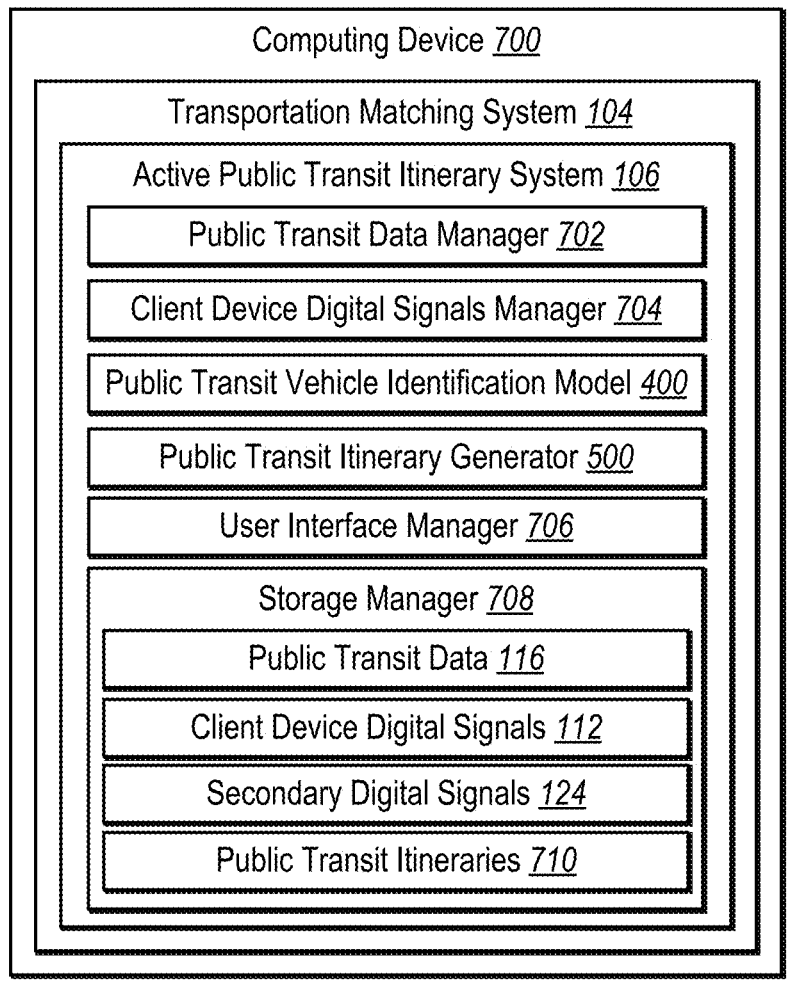
FIG. 7 illustrates a block diagram of a computing device including various components of an active public transit itinerary system in accordance with one or more implementations.

Looking now to FIG. 7, additional detail is provided regarding the components and capabilities of the transit itinerary system 106 in accordance with one or more implementations. Specifically, FIG. 7 illustrates a schematic diagram of the transit itinerary system 106 on a computing device 700 that includes the transportation matching system 104 and the transit itinerary system 106 (i.e., the active public transit itinerary system 106). The computing device can represent one or more of the server device 102 and/or the client devices 108, 600 described above. Indeed, some or all the components of the transportation matching system 104 and/or transit itinerary system 106 are implemented on a server device or client device.

As shown, the transportation matching system 104 is located on the computing device 700. In general, the computing device 700 represents various types of computing devices. For example, in some implementations, the computing device 700 is a non-mobile device, such as a desktop or server, or another type of computing device. In other implementations, the computing device 700 is a mobile device, such as a laptop, a tablet, a mobile telephone, a smartphone, etc. In some implementations, some or all the components of the transportation matching system 104 and/or transit itinerary system 106 are implemented across multiple server devices and/or client devices. Additional details regarding the computing device 700 are discussed below as well as with respect to FIG. 9.

The transit itinerary system 106 includes various components for performing the processes and features described herein. For example, the transit itinerary system 106 includes a public transit data manager 702, a client device digital signals manager 704, the public transit vehicle identification model 400, the public transit itinerary generator 500, a user interface manager 706 and a storage manager 708 having the public transit data 116, the client device digital signals 112, the secondary digital signals 124, and public transit itineraries 710. Each of these components is further described below.

As shown, the transit itinerary system 106 includes the public transit data manager 702. In various implementations, the public transit data manager 702 facilitates communications with a public transit device and/or a third-party system to access the public transit data 116 described above. For example, the public transit data manager 702 obtains public transit route information and public transit vehicle travel data with respect to a public transit vehicle on which a client device may travel or is traveling.

As also shown, the transit itinerary system 106 includes the client device digital signals manager 704 (or simply "digital signals manager 704"). In one or more implementations, the digital signals manager 704 facilitates communications with a client device to obtain the one or more client device digital signals 112 (or simply "digital signals 112") from the client device. For example, as described above, digital signals 112 can include location information and motion information of the client device. In some implementations, the digital signals manager 704 also communicates with secondary devices to receive the secondary digital signals 124 with respect to the client device, as described above.

As shown, the transit itinerary system 106 includes the public transit vehicle identification model 400. As described above, the public transit vehicle identification model 400 can determine the public transit vehicle on which the client device is traveling. For example, the public transit vehicle identification model 400 compares the public transit data 116 with the digital signals 112 and/or secondary digital signals 124 to determine a public transit vehicle on which the client device is traveling, as detailed above.

In addition, as shown, the transit itinerary system 106 includes the public transit itinerary generator 500. In various implementations, the public transit itinerary generator 500 facilitates, generates, obtains, modifies, weighs, scores, and/or updates public transit itineraries 710, as previously described. For example, the public transit itinerary generator 500 can provide the client device with a public transit itinerary 710 in response to a transportation request. Further, the public transit itinerary generator 500 can proactively or reactively identify and provide alternative public transit itineraries (i.e., public transit itinerary 710) while the client device is traveling on a public transit vehicle, as also described above.

As mentioned, the transit itinerary system 106 includes a user interface manager 706. In particular, the user interface manager 706 can manage, maintain, provide, display, cause to be displayed, present, render, or identify information pertaining to a user interface such as a graphical user interface on a client device (e.g., requestor device). For example, the user interface manager 706 can provide a user interface for display on a client device that includes a public transit itinerary along with updated corresponding graphics and text. In addition, the user interface manager 706 can receive user input (or indications of user input) such as selections of transportation options or elements with the graphical user interface on the client device. Moreover, the user interface manager 706 can provide data to a client device that causes the client device to show real-time updates of one or more public transit itineraries 710, as previously described.

The transit itinerary system 106 further includes a storage manager 708. In particular, the storage manager 708 manages, maintains, stores, accesses, retrieves, receives, provides, and/or otherwise identifies information within a database. For example, the storage manager 708 records, stores, accesses, and/or provides rules, algorithms, and/or formulas for generating and providing transportation requests, public transit itineraries, and transportation services to components of the transit itinerary system 106.

In one or more implementations, each of the components of the transit itinerary system 106 is in communication with one another using any suitable communication technologies. Additionally, the components of the transit itinerary system 106 can be in communication with one or more other devices including one or more client devices described above. It will be recognized that although the components of the transit itinerary system 106 are shown to be separate in FIG. 7, any of the subcomponents may be combined into fewer components, such as into a single component, or divided into more components as may serve a particular implementation. Furthermore, although the components of FIG. 7 are described in connection with the transit itinerary system 106, at least some of the components for performing operations in conjunction with the transit itinerary system 106 described herein may be implemented on other devices within the system.

The components of the transit itinerary system 106 can include software, hardware, or both. For example, the components of the transit itinerary system 106 can include one or more instructions stored on a computer-readable storage medium and executable by processors of one or more computing devices (e.g., the computing device 700). When executed by one or more processors, the computer-executable instructions of the transit itinerary system 106 can cause the computing device 700 to perform the methods described herein. Alternatively, the components of the transit itinerary system 106 can comprise hardware, such as a special purpose processing device to perform a certain function or group of functions. Additionally or alternatively, the components of the transit itinerary system 106 can include a combination of computer-executable instructions and hardware.

Furthermore, the components of the transit itinerary system 106 performing the functions described herein may, for example, be implemented as part of a stand-alone application, as a module of an application, as a plug-in for applications including content management applications, as a library function or functions that may be called by other applications, and/or as a cloud-computing model. Thus, the components of the transit itinerary system 106 may be implemented as part of a stand-alone application on a personal computing device or a mobile device. Alternatively or additionally, the components of the transit itinerary system 106 may be implemented in any application that allows creation and delivery of marketing content to users, including, but not limited to, various applications.

FIGS. 1-7, the corresponding text, and the examples provide a number of different systems, methods, and non-transitory computer-readable media for generating alternative public transit itineraries based on detecting a client device traveling on a public transit vehicle. In addition to the foregoing, implementations can also be described in terms of flowcharts comprising acts for accomplishing a particular result. For example, FIG. 8 illustrates a flowchart of an example sequence of acts in accordance with one or more implementations.

Figure 8:
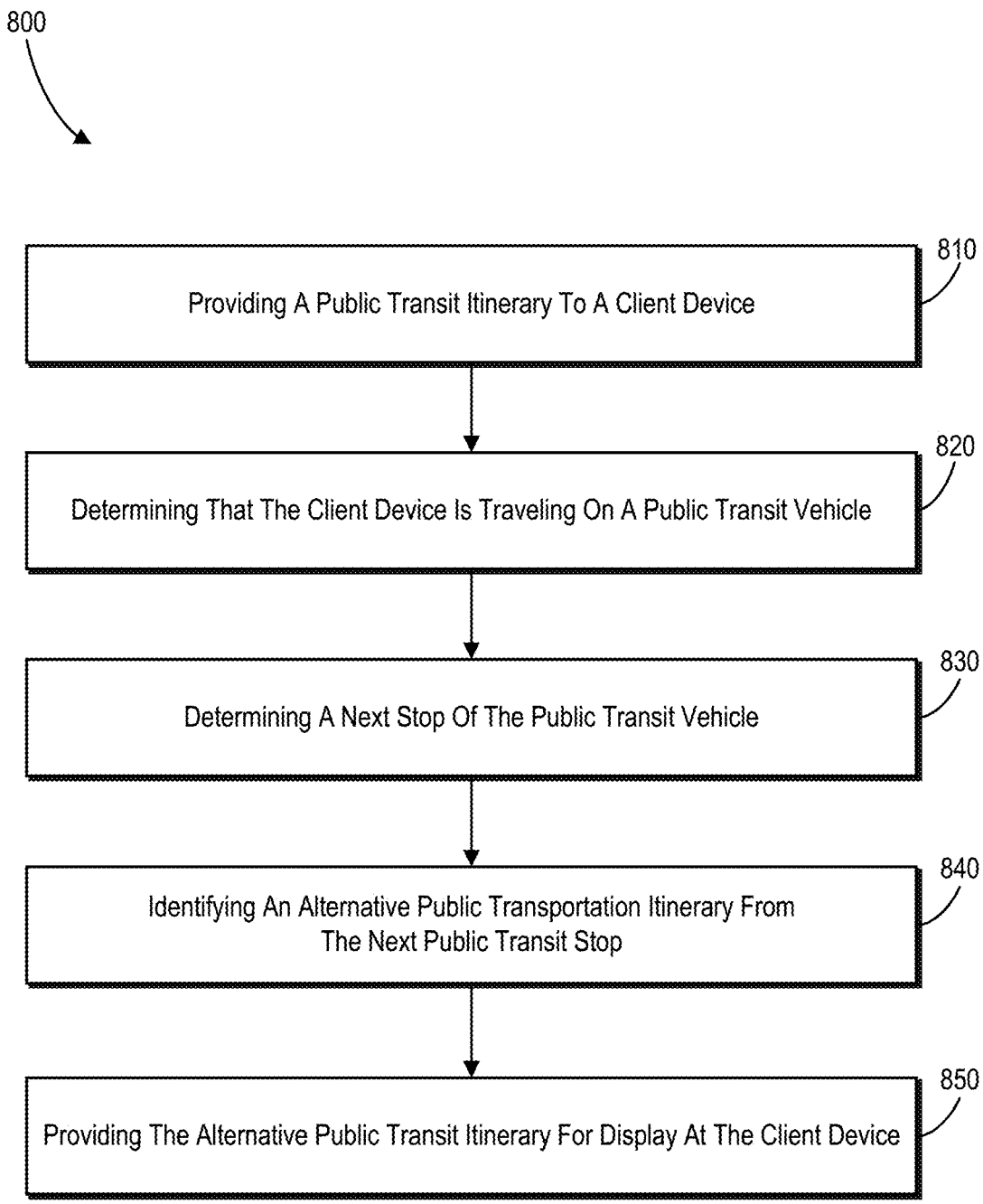
FIG. 8 illustrates a flow diagram of a series of acts for determining and providing alternative public transit itineraries to a client device while the client device is traveling on a public transit vehicle in accordance with one or more implementations.

For example, FIG. 8 illustrates a flowchart of an exemplary sequence of acts 800 for determining and providing alternative public transit itineraries to a client device while the client device is traveling on a public transit vehicle in accordance with one or more implementations. In addition, FIG. 8 may be performed with more or fewer acts. Further, the acts may be performed in differing orders. Additionally, the acts described herein may be repeated or performed in parallel with one another or parallel with different instances of the same or similar acts.

While FIG. 8 illustrates the series of acts 800 according to particular implementations, alternative implementations may omit, add to, reorder, and/or modify any of the acts shown. The series of acts 800 can be performed as part of a method. Alternatively, a non-transitory computer-readable medium can comprise instructions, when executed by one or more processors, cause a computing device (e.g., a client device and/or a server device) to perform the series of acts of 800. In still further implementations, a system performs the series of acts of 800.

As shown, the series of acts 800 can include an act 810 of providing a public transit itinerary to a client device. For example, the act 810 can involve, in response to receiving a transportation request, providing, for display by a client device, a public transit itinerary to a destination, the public transit itinerary including a public transit segment. In one or more implementations, the public transit itinerary includes a public transit segment that utilizes a target public transit vehicle. In various implementations, the act 810 includes providing, for display by the client device, a target public transit vehicle as part of the public transit itinerary. In some implementations, the public transit itinerary specifies a target public transit vehicle traveling along the public transit segment.

As shown, the series of acts 800 can include an act 820 of determining that the client device is traveling on a public transit vehicle. For example, the act 820 can involve processing one or more digital signals associated with the client device to determine that the client device is traveling on a public transit vehicle corresponding to the public transit segment. In one or more implementations, the act 820 includes identifying one or more digital signals associated with the client device and travel data corresponding to the target public transit vehicle. In various implementations, the act 820 includes processing the one or more digital signals associated with the client device to confirm that the public transit vehicle on which the client device is traveling is the target public transit vehicle. In some implementations, the act 820 includes processing the one or more digital signals associated with the client device to determine that the public transit vehicle on which the client device is traveling is not the target public transit vehicle.

In one or more implementations, the act 820 includes determining the one or more digital signals by collecting real-time location information of the client device. In various implementations, the act 820 includes determining that the client device is traveling on the public transit vehicle corresponding to the public transit segment based on user input from the client device indicating that the client device is traveling on the public transit vehicle. For example, the client device receives user input selecting the public transit itinerary and an indication of the selected public transit itinerary is provided as a digital signal.

In some implementations, the one or more digital signals include wireless beacon communications from one or more wireless beacons along the public transit segment. In additional implementations, the act 820 includes processing the wireless beacon communications to determine that the client device is traveling on the public transit vehicle based on detecting the client device communicating with the one or more wireless beacons along the public transit segment. In various implementations, the one or more digital signals include motion signals from the requestor device. In additional implementations, the act 820 can also include determining that the client device is traveling on the public transit vehicle by comparing the motion signals to the travel data.

As shown, the series of acts 800 can include an act 830 of determining a next stop of the public transit vehicle. For example, the act 830 can involve determining a next public transit stop for the public transit vehicle based on travel data of the public transit vehicle. In one or more implementations, the act 830 includes comparing the one or more digital signals associated with the client device with the travel data corresponding to the target public transit vehicle to determine that the client device is traveling on a public transit vehicle along the public transit segment.

In one or more implementations, the travel data includes real-time location information of the public transit vehicle associated with the public transit segment. In additional implementations, the act 830 also includes determining that the client device is traveling on the public transit vehicle by comparing the real-time location information of the public transit vehicle with the real-time location information of the client device.

In some implementations, the travel data includes pre-scheduled location information of one or more public transit stop locations and corresponding travel times of the public transit vehicle along the public transit segment. In one or more implementations, the act 830 also includes determining that the client device is traveling on the public transit vehicle by comparing the one or more public transit stop locations and corresponding travel times of the public transit vehicle with the real-time location information of the client device. In various implementations, the act 840 also includes determining an estimated time of arrival (ETA) of the public transit vehicle at the next public transit stop.

As shown, the series of acts 800 can include an act 840 of identifying an alternative public transportation itinerary from the next public transit stop. For example, the act 840 can involve identifying one or more alternative public transportation itineraries to the destination from the next public transit stop. In various implementations, the act 840 includes generating the one or more alternative public transit itineraries to the destination based on determining that the public transit vehicle on which the client device is traveling is not the target public transit vehicle. In one or more implementations, the act 840 also includes determining the one or more alternative public transit itineraries to the destination from the next public transit stop by selecting a next public transit segment based on the estimated time of arrival of the public transit vehicle at the next public transit stop.

In one or more implementations, the act 840 also includes determining the one or more alternative public transportation itineraries to the destination from the next public transit stop by adding a transfer cost weight to public transit transfer itineraries of the one or more alternative public transit itineraries that include the client device transferring to a new public transit vehicle at the next public transit stop. In some implementations, the act 840 includes automatically determining the one or more alternative public transit itineraries while the client device is traveling on the public transit vehicle. In one or more implementations, the act 840 includes proactively determining the alternative public transit itineraries automatically and not based on receiving an additional transportation request.

As shown, the series of acts 800 can include an act 850 of providing the alternative public transit itinerary for display at the client device. For example, the act 850 can involve providing, for display by the client device during the public transit segment, the one or more alternative public transit itineraries to the destination. Indeed, the act 850 can include providing, for display by the client device during the public transit segment, one or more alternative public transit itineraries to the destination by determining a next public transit stop for the public transit vehicle based on travel data of the public transit vehicle; and identifying the one or more alternative public transportation itineraries to the destination from the next public transit stop.

In one or more implementations, the act 850 includes providing, for display by the client device during the public transit segment, one or more alternative public transit itineraries to the destination by identifying the one or more alternative public transportation itineraries to the destination from a location along the public transit segment. In various implementations, the act 850 includes providing, for display by the client device, an indication that the client device is traveling on the target public transit vehicle in accordance with the public transit itinerary in response to confirming that the public transit vehicle is the target public transit vehicle. In one or more implementations, the act 850 includes providing, for display by the client device before arriving at the next public transit stop, the one or more alternative public transit itineraries to the destination.

The series of acts 800 can include various additional acts. To illustrate, the series of acts 800 can include the acts of receiving an additional transportation request to the destination from the client device while the client device is traveling on the public transit vehicle; in response to receiving the additional transportation request, determining the one or more alternative public transit itineraries; and providing, for display by the client device before arriving at the next public transit stop, the one or more alternative public transit itineraries to the destination.

Further, the series of acts 800 can include the acts of determining a set of alternative public transit itineraries from the next public transit stop to the destination in response to determining that the client device is traveling on the public transit vehicle; generating public transit itinerary scores for the alternative public transit itineraries in the set of alternative public transit itineraries; and selecting the one or more alternative public transit itineraries by comparing the public transit itinerary scores for the alternative public transit itineraries in the set of alternative public transit itineraries and a public transit itinerary score for the public transit itinerary.

In addition, in one or more implementations, the series of acts 800 can include the acts of detecting a change to a future segment of the public transit itinerary; automatically determining the one or more alternative public transit itineraries in response to detecting the change to the future segment of the public transit itinerary; and providing, for display by the client device before arriving at the future segment, a notification indicating the one or more alternative public transit itineraries to the destination.

In some implementations, the series of acts 800 can include the acts of receiving, from the client device, a selection of the public transit itinerary, confirmation that the client device boarded the target public transit vehicle, or an indication the client device did not board the public transit vehicle indicated in the public transit itinerary (e.g., the target public transit vehicle).

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, mini-computers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
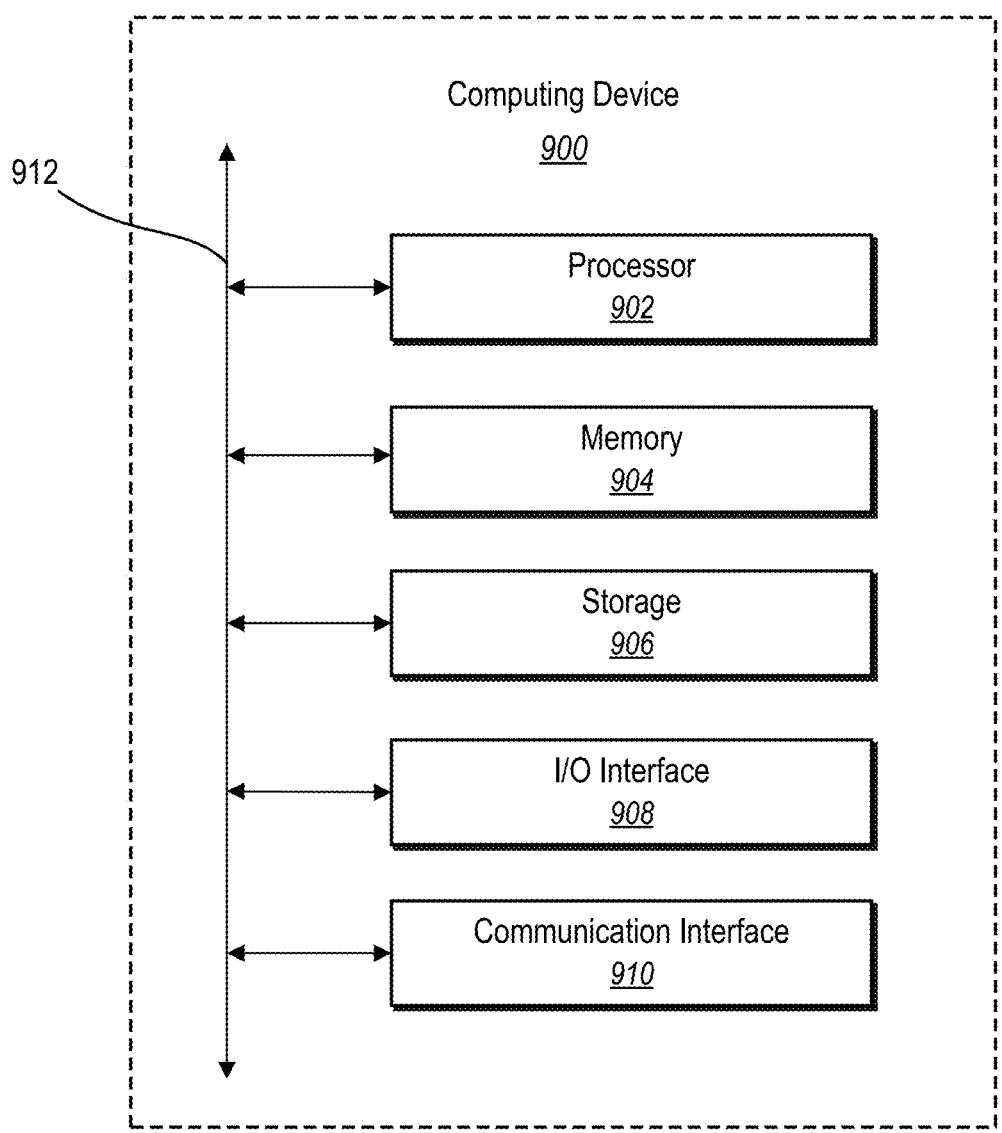
FIG. 9 illustrates a block diagram of a computing device for implementing one or more implementations of the present disclosure.

FIG. 9 illustrates, in block diagram form, a computing device 900 (e.g., an example computing device) that may be configured to perform one or more of the processes described above. One will appreciate that the transit itinerary system 106 can comprise implementations of the computing device 900, including, but not limited to, the server device 102; the client device 108, 600, the public transit device 114; and/or the one or more secondary device(s) 122. As shown by FIG. 9, the computing device can comprise a processor 902, memory 904, a storage device 906, an I/O interface 908, and a communication interface 910. In certain implementations, the computing device 900 can include fewer or more components than those shown in FIG. 9. Components of computing device 900 shown in FIG. 9 will now be described in additional detail.

In particular implementations, the processor 902 includes hardware for executing instructions, such as those making up a computer program. As an example, and not by way of limitation, to execute instructions, the processor 902 may retrieve (or fetch) the instructions from an internal register, an internal cache, memory 904, or a storage device 906 and decode and execute them.

The computing device 900 includes memory 904, which is coupled to the processor 902. The memory 904 may be used for storing data, metadata, and programs for execution by the processor 902. The memory 904 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, storage device 906 can comprise a non-transitory storage medium described above. The storage device 906 may include a hard disk drive ("HDD"), flash memory, a Universal Serial Bus ("USB") drive or a combination of these or other storage devices.

The computing device 900 also includes one or more input or output interface 908 (or "I/O interface 908"), which are provided to allow a user (e.g., requestor, rider, or provider) to provide input to (such as user strokes), receive output from, and otherwise transfer data to and from the computing device 900. These I/O interface 908 may include a mouse, keypad or a keyboard, a touch screen, camera, optical scanner, network interface, modem, other known I/O devices or a combination of the I/O interface 908. The touch screen may be activated with a stylus or a finger.

The I/O interface 908 may include one or more devices for presenting output to a user, including, but not limited to, a graphics engine, a display (e.g., a display screen), one or more output providers (e.g., display providers), one or more audio speakers, and one or more audio providers. In certain implementations, interface 908 is configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 can provide one or more interfaces for communication (such as, for example, packet-based communication) between the computing device 900 and one or more other computing devices or one or more networks. As an example, and not by way of limitation, communication interface 910 may include a network interface controller ("NIC") or network adapter for communicating with an Ethernet or other wire-based network or a wireless NIC ("WNIC") or wireless adapter for communicating with a wireless network, such as a WI-FI. The computing device 900 can further include a bus 912. The bus 912 can comprise hardware, software, or both that connects components of computing device 900 to each other.

Figure 10:
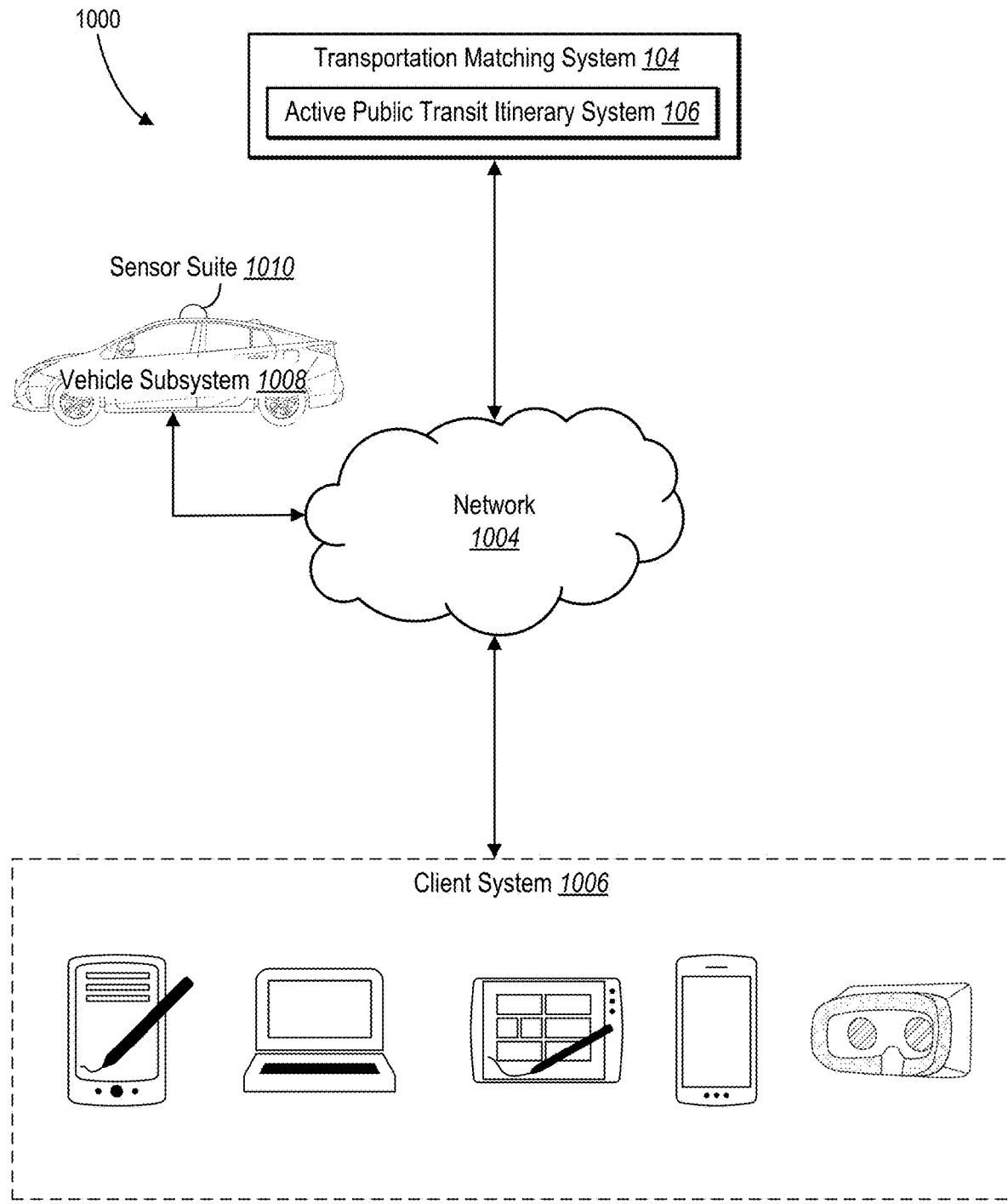
FIG. 10 illustrates an example environment for a transportation matching system in accordance with one or more implementations.

FIG. 10 illustrates a network system 1000 (i.e., an example network environment) of the transportation matching system 104. The network system 1000 includes a client device 1006 (e.g., the client device 108, 600), a transportation matching system 104 implementing the active public transit itinerary system 106, and a vehicle subsystem 1008 connected to each other by a network 1004. Although FIG. 10 illustrates a particular arrangement of the client device 1006, the transportation matching system 104, the vehicle subsystem 1008, and the network 1004, this disclosure contemplates any suitable arrangement of client device 1006, the transportation matching system 104, the vehicle subsystem 1008, and the network 1004. As an example, and not by way of limitation, two or more of client device 1006, the transportation matching system 104, and the vehicle subsystem 1008 communicate directly, bypassing the network 1004. As another example, two or more of client device 1006, the transportation matching system 104, and the vehicle subsystem 1008 may be physically or logically co-located with each other in whole or in part.

Moreover, although FIG. 10 illustrates one client device 1006, transportation matching system 104, vehicle subsystem 1008, and network 1004, this disclosure contemplates any suitable number of client devices, transportation matching systems, vehicle subsystems, and networks. As an example, and not by way of limitation, the network system 1000 may include multiple client devices and/or networks.

This disclosure contemplates any suitable network. As an example, and not by way of limitation, one or more portions of the network 1004 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. The network 1004 may include one or more networks.

Links may connect the client device 1006, the transit itinerary system 106, and the vehicle subsystem 1008 to the network 1004 or to each other. This disclosure contemplates any suitable links. In particular implementations, one or more links include one or more wireline (such as for example Digital Subscriber Line ("DSL") or Data Over Cable Service Interface Specification ("DOC SIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular implementations, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network system 1000. One or more first links may differ in one or more respects from one or more second links.

In particular implementations, the client device 1006 may be an electronic device including hardware, software, or embedded logic components or a combination of two or more such components and capable of carrying out the appropriate functionalities implemented or supported by client device 1006. As an example, and not by way of limitation, a client device 1006 may include any of the computing devices discussed above in relation to FIG. 9. A client device 1006 may enable a network user at the client device 1006 to access the network 1004. A client device 1006 may enable its user to communicate with other users at other client devices 1006.

In particular implementations, the client device 1006 may include a requestor application, rider application, or a web browser, and may have one or more add-ons, plug-ins, or other extensions, such as a toolbar. A user at the client device 1006 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 1006 one or more Hyper Text Markup Language ("HTML") files responsive to the HTTP request. The client device 1006 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular implementations, transportation matching system 104 may be a network-addressable computing system that can host a transportation matching network. The transportation matching system 104 may generate, store, receive, and send data, such as, for example, user-profile data, concept-profile data, text data, transportation request data, GPS location data, provider data, requestor data, rider data, vehicle data, or other suitable data related to the transportation matching network. This may include authenticating the identity of providers and/or vehicles who are authorized to provide transportation services through the transportation matching system 104. In addition, the transportation matching system 104 may manage identities of service requestors and/or riders, such as users/requestors/proxy riders. In particular, the transportation matching system 104 may maintain requestor and/or rider data such as driving/riding histories, personal data, or other user data in addition to navigation and/or traffic management services or other location services (e.g., GPS services).

In particular implementations, the transportation matching system 104 may manage transportation matching services to connect a user/requestor/rider with a vehicle and/or provider. By managing the transportation matching services, the transportation matching system 104 can manage the distribution and allocation of resources from vehicle systems and user resources such as GPS location and availability indicators, as described herein.

The transportation matching system 104 may be accessed by the other components of network system 1000 either directly or via the network 1004. In particular implementations, the transportation matching system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular implementations, each server may include hardware, software, or embedded logic components or a combination of two or more such components for carrying out the appropriate functionalities implemented or supported by server.

In particular implementations, the transportation matching system 104 may include one or more data stores. Data stores may be used to store various types of information. In particular implementations, the information stored in data stores may be organized according to specific data structures. In particular implementations, each data store may be a relational, columnar, correlation, or other suitable database. Although this disclosure describes or illustrates particular types of databases, this disclosure contemplates any suitable types of databases. Particular implementations may provide interfaces that enable a client device 1006, or a transportation matching system 104 to manage, retrieve, modify, add, or delete, the information stored in data store.

In particular implementations, the transportation matching system 104 may provide users with the ability to take actions on various types of items or objects, supported by the transportation matching system 104. As an example, and not by way of limitation, the items and objects may include transportation matching networks to which users of the transportation matching system 104 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the transportation matching system 104 or by an external system of a third-party system, which is separate from transportation matching system 104 and coupled to the transportation matching system 104 via a network 1004.

In particular implementations, the transportation matching system 104 may be capable of linking a variety of entities. As an example, and not by way of limitation, the transportation matching system 104 may enable users to interact with each other or other entities, or to allow users to interact with these entities through an application programming interfaces ("API") or other communication channels.

In particular implementations, the transportation matching system 104 may include a variety of servers, subsystems, programs, modules, logs, and data stores. In particular implementations, the transportation matching system 104 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile (e.g., provider profile, rider profile, or requestor profile) store, connection store, third-party content store, or location store. The transportation matching system 104 may also include suitable components such as network interfaces, security mechanisms, load balancers, failover servers, management-and-network-operations consoles, other suitable components, or any suitable combination thereof.

In particular implementations, the transportation matching system 104 may include one or more user-profile stores for storing user profiles for transportation providers, transportation riders, and/or transportation requestors. A user profile may include, for example, biographic information, demographic information, behavioral information, social information, or other types of descriptive information, such as interests, affinities, or location.

The web server may include a mail server or other messaging functionality for receiving and routing messages between the transportation matching system 104 and one or more client devices 1006. An action logger may be used to receive communications from a web server about a user's actions on or off the transportation matching system 104. In conjunction with the action log, a third-party-content-object log may be maintained of user exposures to third-party-content objects. A notification controller may provide information regarding content objects to a client device 1006.

Information may be pushed to a client device 1006 as notifications, or information may be pulled from client device 1006 responsive to a request received from client device 1006. Authorization servers may be used to enforce one or more privacy settings of the users of the transportation matching system 104. A privacy setting of a user determines how particular information associated with a user can be shared. The authorization server may allow users to opt in to or opt out of having their actions logged by the transportation matching system 104 or shared with other systems, such as, for example, by setting appropriate privacy settings. Third-party-content-object stores may be used to store content objects received from third parties. Location stores may be used for storing location information received from client devices 1006 associated with users.

In addition, the vehicle subsystem 1008 can include a human-operated vehicle or an autonomous vehicle. A provider of a human-operated vehicle can perform maneuvers to pick up, transport, and drop off one or more requestors or proxy riders according to the implementations described herein. In certain implementations, the vehicle subsystem 1008 can include an autonomous vehicle—i.e., a vehicle that does not require a human operator. In these implementations, the vehicle subsystem 1008 can perform maneuvers, communicate, and otherwise function without the aid of a human provider, in accordance with available technology.

In particular implementations, the vehicle subsystem 1008 may include one or more sensors incorporated therein or associated thereto. For example, a sensor suite 1010 can be mounted on the top of the vehicle subsystem 1008 or else can be located within the interior of the vehicle subsystem 1008. In certain implementations, the sensor suite 1010 can be located in multiple areas at once—i.e., split up throughout the vehicle subsystem 1008 so that different components of the sensor suite 1010 can be placed in different locations in accordance with optimal operation of the sensor suite 1010. In these implementations, the sensor suite 1010 can include motion-related components such as an inertial measurement unit ("IMU") including one or more accelerometers, one or more gyroscopes, and one or more magnetometers. The sensor suite 1010 can additionally or alternatively include a wireless IMU ("WIMU"), one or more cameras, one or more microphones, or other sensors or data input devices capable of receiving and/or recording information relating to navigating a route to pick up, transport, and/or drop off a requestor and/or proxy rider.

In particular implementations, the vehicle subsystem 1008 may include a communication device (e.g., the provider device 70) capable of communicating with the client device 1006 and/or the transit itinerary system 106. For example, the vehicle subsystem 1008 can include an on-board computing device communicatively linked to the network 1004 to transmit and receive data such as GPS location information, sensor-related information, requestor location information, rider location information, or other relevant information.

In the foregoing specification, the disclosed features have been described with reference to specific exemplary implementations thereof. Various implementations and aspects of the features are described with reference to details discussed herein, and the accompanying drawings illustrate the various implementations. The description above and drawings are illustrative and are not to be construed as limiting. Numerous specific details are described to provide a thorough understanding of various implementations of the disclosed features.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope is, therefore, indicated by the appended claims rather than by the foregoing description. All changes that come within the meaning and range of equivalency of the claims are to be embraced within their scope.

What is claimed is:

1. A method comprising:
   in response to receiving a transportation request, providing, for display on a client device by at least one processor, a public transit itinerary to a destination on a user interface of the client device, the public transit itinerary comprising a public transit segment;
   receiving, by the at least one processor, one or more initial digital signals from a sensor suite of the client device, wherein the one or more initial digital signals comprises motion information of the client device and the sensor suite comprises at least one of an accelerometer, a gyroscope, or a magnetometer;
   comparing, by the at least one processor, the one or more initial digital signals associated with the client device with data associated with a plurality of public transit vehicles to generate a first initial probability score that the client device is traveling on a first public transit vehicle corresponding to the public transit segment;
   comparing, by the at least one processor, the one or more initial digital signals associated with the client device with the data associated with the plurality of public transit vehicles to generate a second initial probability score that the client device is traveling on a second public transit vehicle corresponding to the public transit segment;
   receiving, by the at least one processor, one or more additional digital signals from the sensor suite of the client device;
   comparing, by the at least one processor, the one or more additional digital signals associated with the client device with data associated with the plurality of public transit vehicles to generate a first updated probability score that the client device is traveling on the first public transit vehicle and a second updated probability score that the client device is traveling on the second public transit vehicle;
   determining, based on the first updated probability score by the at least one processor, that the client device is not traveling on the first public transit vehicle corresponding to the public transit segment;
   based on determining that the second updated probability score satisfies a threshold probability, determining, by the at least one processor, that the client device is traveling on the second public transit vehicle corresponding to the public transit segment;
   based on determining that the client device is traveling on the second public transit vehicle and based on progress of the second public transit vehicle along the public transit segment, updating, by the at least one processor, the public transit itinerary initially displayed on the user interface of the client device;

in response to updating the public transit itinerary, providing, for display on the user interface of the client device during the public transit segment by the at least one processor, a selectable proactive notification within the user interface of the client device; and in response to detecting a selection of the selectable proactive notification within the user interface, providing for display on the user interface, one or more selectable alternative public transit itineraries to the destination and the one or more selectable alternative public transit itineraries is determined by:
  determining a next public transit stop for the second public transit vehicle based on travel data of the second public transit vehicle; and
  identifying the one or more selectable alternative public transit itineraries to the destination from the next public transit stop.

2. The method of claim 1, further comprising comparing the one or more initial digital signals associated with the client device with the data associated with the plurality of public transit vehicles utilizing a public transit vehicle identification machine learning model to generate the first initial probability score.

3. The method of claim 1, wherein comparing the one or more initial digital signals associated with the client device with the data associated with the plurality of public transit vehicles comprises comparing at least one of compass data, acceleration data, deceleration data, or directional data with the data associated with the plurality of public transit vehicles.

4. The method of claim 1, wherein the travel data comprises real-time location information of the second public transit vehicle associated with the public transit segment; and further comprising:
  generating the second updated probability score by collecting real-time location information of the client device based on GPS location data; and
  determining that the client device is traveling on the second public transit vehicle by comparing the real-time location information of the second public transit vehicle with the real-time location information of the client device.

5. The method of claim 1, wherein the travel data comprises pre-scheduled location information of one or more public transit stop locations and corresponding travel times of the second public transit vehicle along the public transit segment; and further comprising:
  determining the one or more initial digital signals by collecting real-time location information of the client device; and
  determining that the client device is traveling on the second public transit vehicle by comparing the one or more public transit stop locations and corresponding travel times of the second public transit vehicle with the real-time location information of the client device.

6. The method of claim 1, further comprising:
  determining an estimated time of arrival of the second public transit vehicle at the next public transit stop; and
  determining the one or more selectable alternative public transit itineraries to the destination from the next public transit stop by selecting a next public transit segment based on the estimated time of arrival of the second public transit vehicle at the next public transit stop.

7. The method of claim 6, further comprising determining the one or more selectable alternative public transit itineraries to the destination from the next public transit stop by adding a transfer cost weight to public transit transfer itineraries of the one or more selectable alternative public transit itineraries that include the client device transferring to a new public transit vehicle at the next public transit stop.

8. The method of claim 1, wherein comparing the one or more initial digital signals associated with the client device further comprises:
  receiving at least one of Wi-Fi signal data associated with the client device, or cellular location data associated with the client device; and
  comparing at least one of the Wi-Fi signal data or the cellular location data with the data associated with the plurality of public transit vehicles.

9. The method of claim 1, further comprising:
  receiving an additional transportation request to the destination from the client device while the client device is traveling on the second public transit vehicle;
  in response to receiving the additional transportation request, determining the one or more selectable alternative public transit itineraries; and
  providing, for display by the client device before arriving at the next public transit stop, the one or more selectable alternative public transit itineraries to the destination.

10. The method of claim 2, further comprising training the public transit vehicle identification machine learning model by:
  utilizing training data comprising a plurality of digital signals, a plurality of data associated with associated with a plurality of public transit vehicles, and a plurality of ground truth public transit vehicles from historically gathered data to generate a public transit vehicle prediction from the plurality of digital signals and the plurality of data associated with the plurality of public transit vehicles;
  comparing the public transit vehicle prediction with a ground truth public transit vehicle of the plurality of ground truth public transit vehicles form the historically gathered data to determine a measure of loss; and
  back-propagating the measure of loss to modify parameters of the public transit vehicle identification machine learning model.

11. A system comprising:
  at least one processor; and
  a non-transitory computer-readable medium comprising instructions that, when executed by the at least one processor, cause the system to:
    in response to receiving a transportation request, provide, for display by a client device, a public transit itinerary to a destination on a user interface of the client device, the public transit itinerary comprising a public transit segment;
    receive one or more initial digital signals from a sensor suite of the client device, wherein the one or more initial digital signals comprises motion information of the client device and the sensor suite comprises at least one of an accelerometer, a gyroscope, or a magnetometer;
    identify the one or more initial digital signals associated with the client device and a plurality of travel data corresponding to a plurality of public transit vehicles;
    compare the one or more initial digital signals associated with the client device with the plurality of travel data corresponding to the plurality of public transit vehicles to generate a first initial probability score that the client device is traveling on a first public transit vehicle along the public transit segment;

compare the one or more initial digital signals associated with the client device with the plurality of travel data associated with the plurality of public transit vehicles to generate a second initial probability score that the client device is traveling on a second public transit vehicle along the public transit segment;

receive one or more additional digital signals from the sensor suite of the client device;

compare the one or more additional digital signals associated with the client device with the plurality of travel data corresponding to the plurality of public transit vehicles to generate a first updated probability score that the client device is traveling on the first public transit vehicle and a second updated probability score that the client device is traveling on the second public transit vehicle;

determine, based on the first updated probability score, that the client device is not traveling on the first public transit vehicle corresponding to the public transit segment;

based on determining that the second updated probability score satisfies a threshold probability, determine that the client device is traveling on the second public transit vehicle corresponding to the public transit segment;

based on determining that the client device is traveling on the second public transit vehicle and based on progress of the second public transit vehicle along the public transit segment, update the public transit itinerary initially displayed on the user interface of the client device;

in response to updating the public transit itinerary, provide, for display by the user interface of the client device during the public transit segment, a selectable proactive notification within the user interface of the client device; and in response to detecting a selection of the selectable proactive notification within the user interface, provide for display on the user interface, one or more selectable alternative public transit itineraries to the destination by identifying the one or more selectable alternative public transit itineraries to the destination from a location along the public transit segment.

12. The system of claim 11, further comprising instructions that, when executed by the at least one processor, cause the system to:

detect a change to a future segment of the public transit itinerary;

in response to detecting the change to the future segment of the public transit itinerary, automatically determine the one or more selectable alternative public transit itineraries; and provide, for display by the client device before arriving at the future segment, a notification displayed on the user interface, wherein the notification indicates the one or more selectable alternative public transit itineraries to the destination.

13. The system of claim 11, wherein:

the plurality of travel data corresponding to the second public transit vehicle comprises real-time location information of the second public transit vehicle traveling along the public transit segment; and the one or more initial digital signals and the one or more additional digital signals comprise real-time location information of the client device based on GPS location data.

14. The system of claim 11, wherein:

the plurality of travel data corresponding to the second public transit vehicle comprises pre-scheduled time and location information of the second public transit vehicle for one or more public transit stop locations along the public transit segment; and the one or more initial digital signals and the one or more additional digital signals comprise real-time location information of the client device.

15. The system of claim 11, further comprising instructions that, when executed by the at least one processor, cause the system to generate the second updated probability score by:

receiving at least one of Wi-Fi signal data associated with the client device or cellular location data associated with the client device; and comparing the at least one of the Wi-Fi signal data or the cellular location data with the plurality of travel data associated with the plurality of public transit vehicles.

16. A non-transitory computer-readable medium comprising instructions that, when executed by at least one processor, cause a computing device to:

in response to receiving a transportation request, provide, for display by a client device, a public transit itinerary to a destination on a user interface of the client device, the public transit itinerary comprising a public transit segment;

receive one or more initial digital signals from a sensor suite of the client device, wherein the one or more initial digital signals comprises motion information of the client device and the sensor suite comprises at least one of an accelerometer, a gyroscope, or a magnetometer;

compare the one or more initial digital signals associated with the client device with data associated with a plurality of public transit vehicles to generate a first initial probability score that the client device is traveling on a first public transit vehicle corresponding to the public transit segment, wherein the one or more initial digital signals comprises motion information of the client device;

compare the one or more initial digital signals associated with the client device with the data associated with the plurality of public transit vehicles to generate a second initial probability score that the client device is traveling on a second public transit vehicle along the public transit segment;

receive one or more additional digital signals from the sensor suite of the client device;

compare the one or more additional digital signals associated with the client device with data associated with the plurality of public transit vehicles to generate a first updated probability score that the client device is traveling on the first public transit vehicle and a second updated probability score that the client device is traveling on the second public transit vehicle;

determine, based on the first updated probability score, that the client device is not traveling on the first public transit vehicle corresponding to the public transit segment;

based on determining that the second updated probability score satisfies a threshold probability, determine that the client device is traveling on the second public transit vehicle corresponding to the public transit segment;

based on determining that the client device is traveling on the second public transit vehicle and based on progress of the second public transit vehicle along the public transit segment, update the public transit itinerary initially displayed on the user interface of the client device;

in response to updating the public transit itinerary, provide, for display by the user interface of the client device during the public transit segment, a selectable proactive notification within the user interface of the client device; and in response to detecting a selection of the selectable proactive notification within the user interface, provide for display on the user interface, one or more selectable alternative public transit itineraries to the destination before arriving at a next public transit stop for the second public transit vehicle along the public transit segment and the one or more selectable alternative public transit itineraries is determined by:
  generating public transit itinerary scores for alternative public transit itineraries in a set of alternative public transit itineraries to the destination from the next public transit stop; and
  selecting the one or more selectable alternative public transit itineraries by comparing the public transit itinerary scores for the alternative public transit itineraries in the set of alternative public transit itineraries and a public transit itinerary score for the public transit itinerary.

17. The non-transitory computer-readable medium of claim 16, further comprising instructions that, when executed by the at least one processor, cause the computing device to determine that the client device is traveling on the second public transit vehicle corresponding to the public transit segment based on user input from the client device indicating that the client device is traveling on the second public transit vehicle.

18. The non-transitory computer-readable medium of claim 16, further comprising instructions that, when executed by the at least one processor, cause the computing device to:
  provide, for display by the client device, a target public transit vehicle as part of the public transit itinerary; and
  in response to determining that the client device is traveling on the second public transit vehicle corresponding to the public transit segment and confirming that the second public transit vehicle is the target public transit vehicle, provide, for display by the client device, an indication that the client device is traveling on the target public transit vehicle in accordance with the public transit itinerary.

19. The non-transitory computer-readable medium of claim 16, wherein comparing the one or more initial digital signals associated with the client device with the data associated with the plurality of public transit vehicles comprises comparing at least one of compass data, acceleration data, deceleration data, or directional data with the data associated with the plurality of public transit vehicles.

20. The non-transitory computer-readable medium of claim 16, further comprising instructions that, when executed by the at least one processor, cause the computing device to generate the public transit itinerary scores by:
  identifying a subset of alternative public transit itineraries from the set of alternative public transit itineraries that transfer to one or more new public transit vehicles at the next public transit stop; and
  applying a transfer cost weight to the subset of alternative public transit itineraries as part of determining the public transit itinerary scores for the subset of alternative public transit itineraries.

* * * * *